(12) United States Patent  
Powell et al.

(10) Patent No.: US 9,411,998 B2  
(45) Date of Patent: *Aug. 9, 2016

(54) GRAPHICAL CODE READERS THAT ARE CONFIGURED FOR GLARE REDUCTION

(71) Applicant: The Code Corporation, Draper, UT (US)

(72) Inventors: George Powell, Draper, UT (US); Paul Hepworth, Riverton, UT (US); Ryan Hyde, Lehi, UT (US); Ryan Hoobler, Salt Lake City, UT (US)

(73) Assignee: The Code Corporation, Draper, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/706,750

(22) Filed: May 7, 2015

(65) Prior Publication Data

US 2015/0242670 A1 Aug. 27, 2015

Related U.S. Application Data

(63) Continuation of application No. 13/903,799, filed on May 28, 2013, now Pat. No. 9,027,835, which is a continuation of application No. 13/195,209, filed on Aug. 1, 2011, now Pat. No. 8,448,862, which is a continuation of application No. 12/334,404, filed on Dec. 12, 2008, now Pat. No. 8,011,584.

(51) Int. Cl.
*G06K 7/10* (2006.01)
*G06K 7/14* (2006.01)

(52) U.S. Cl.
CPC ............ *G06K 7/10732* (2013.01); *G06K 7/146* (2013.01)

(58) Field of Classification Search
CPC .............. G06K 7/10732; G06K 7/146; G06K 7/10584; G06K 7/14; G06K 2207/1018
USPC ................... 235/455, 462.06, 462.42
See application file for complete search history.

(56) References Cited

U.S. PATENT DOCUMENTS

| 5,597,997 | A | * | 1/1997 | Obata | G06K 7/10732 235/455 |
| 5,920,061 | A | * | 7/1999 | Feng | G06K 7/10722 235/462.42 |
| 6,000,612 | A | * | 12/1999 | Xu | G06K 7/10722 235/454 |
| 6,062,475 | A | * | 5/2000 | Feng | G06K 7/10722 235/462.01 |
| 6,123,263 | A | * | 9/2000 | Feng | G06K 7/10732 235/462.42 |
| 6,606,171 | B1 | * | 8/2003 | Renk | H04N 1/00002 358/475 |

(Continued)

*Primary Examiner* — Paultep Savusdiphol
(74) *Attorney, Agent, or Firm* — Timothy P. O'Hagan; Austin Rapp & Hardman

(57) ABSTRACT

A method for glare reduction may be implemented by a graphical code reader. The method may include illuminating a target area using a plurality of light sources. The method may also include capturing images of the target area using at least one image sensor. The method may also include determining that glare is present in at least one captured image. The method may also include determining glare information that indicates which of the light sources are responsible for the glare. The method may further include taking corrective action to reduce the glare in subsequent images based on the glare information that is determined.

20 Claims, 21 Drawing Sheets

(56) References Cited

U.S. PATENT DOCUMENTS

| | | | | |
|---|---|---|---|---|
| 7,028,901 B2 * | 4/2006 | Carlson | G06K 7/10851 | |
| | | | 235/462.04 | |
| 7,123,755 B2 * | 10/2006 | Shigeta | G06K 9/00013 | |
| | | | 362/3 | |
| 7,128,266 B2 * | 10/2006 | Zhu | G06K 7/10732 | |
| | | | 235/462.22 | |
| 7,475,822 B2 * | 1/2009 | Shiramizu | G06K 7/10722 | |
| | | | 235/462.06 | |
| 7,777,778 B2 * | 8/2010 | Scharenbroch | G06K 9/00604 | |
| | | | 348/143 | |
| 2003/0147550 A1 * | 8/2003 | Shigeta | G06K 9/00013 | |
| | | | 382/124 | |
| 2005/0011956 A1 * | 1/2005 | Carlson | G06K 7/10851 | |
| | | | 235/462.42 | |
| 2005/0207655 A1 * | 9/2005 | Chopra | G06T 7/0004 | |
| | | | 382/218 | |
| 2006/0087582 A1 * | 4/2006 | Scharenbroch | G06K 9/00604 | |
| | | | 348/370 | |
| 2006/0118629 A1 * | 6/2006 | Shiramizu | G06K 7/10722 | |
| | | | 235/454 | |
| 2006/0140502 A1 * | 6/2006 | Tseng | B60J 3/04 | |
| | | | 382/275 | |
| 2006/0202036 A1 * | 9/2006 | Wang | G06K 7/10722 | |
| | | | 235/462.07 | |
| 2007/0040035 A1 * | 2/2007 | Kotlarsky | G06K 7/10683 | |
| | | | 235/462.45 | |
| 2007/0158428 A1 * | 7/2007 | Havens | G06K 7/0004 | |
| | | | 235/462.45 | |
| 2008/0164315 A1 * | 7/2008 | Pankow | G06K 7/10732 | |
| | | | 235/462.42 | |
| 2009/0084847 A1 * | 4/2009 | He | G06K 7/10722 | |
| | | | 235/455 | |

\* cited by examiner

GRAPHICAL CODE READERS THAT ARE CONFIGURED FOR GLARE REDUCTION

CLAIM OF PRIORITY UNDER 35 U.S.C. §120

This application is a continuation of application Ser. No. 13/903,799, filed May 28, 2013, which is a continuation of application Ser. No. 13/195,209, filed Aug. 1, 2011, which is a continuation of application Ser. No. 12/334,404, filed Dec. 12, 2008.

TECHNICAL FIELD

The present disclosure relates generally to graphical code readers. More specifically, the present disclosure relates to graphical code readers that are configured for glare reduction.

BACKGROUND

A machine-readable graphical code ("graphical code") is a graphical representation of information that consists of multiple graphical code elements having different light reflective or light emissive properties. Examples of different types of graphical codes include bar codes, data matrix codes, Maxi-Codes, and so forth. Graphical codes and graphical code readers have become widely used in many commercial environments, such as point-of-sale stations in retail stores and supermarkets, inventory and document tracking, and the like.

Devices for identifying or extracting information from graphical codes are generally referred to as graphical code readers. Image-based graphical code readers typically include one or more light sources for illuminating a graphical code. Light is reflected from the graphical code toward the graphical code reader. One or more lenses within the graphical code reader focus an image of the graphical code onto an image sensor. Pixels within the image sensor are read electronically to provide a two-dimensional array of image data corresponding to the graphical code. A decoder then processes the image data and extracts the information contained in the graphical code.

The present disclosure relates generally to the reduction of glare in the images that are captured by a graphical code reader.

DETAILED DESCRIPTION

The present disclosure relates generally to the reduction of glare in the images that are captured by a graphical code reader. When capturing images for purposes of reading graphical codes, it is generally desirable to provide evenly distributed, uniform illumination. The term glare is generally used to describe illumination that is uneven and non-uniform, e.g., where there is brighter, more intense illumination in spot regions of the captured images.

The term glare may mean different things in different contexts. For example, glare may refer to the effect of undesirable extraneous reflections that cause the background of an image to increase to a level where the scene of interest is not well-imaged, i.e., so that there is very little contrast. This may occur, for example, when a graphical code reader is used to read a graphical code that is located on a reflective surface.

As another example, glare may refer to the effects of specular reflection (i.e., the mirror-like reflection of light from a surface). A graphical code may be printed with black ink on white paper. When a graphical code reader is held at a certain angle, the black ink may become a mirror, so that the illumination of the black ink appears whiter than the nominally white background paper. This effect, which is the result of specular reflection, will be described herein by the use of the term glare.

The above examples are provided for illustration, and should not be construed as limiting the scope of the present disclosure. As used herein, the term glare should be interpreted broadly to encompass any undesirable effect(s) that may result from extraneous or unwanted reflections of light. The techniques disclosed herein may reduce the effects of glare, as broadly defined above, in the images that are captured by a graphical code reader.

Figure 1:
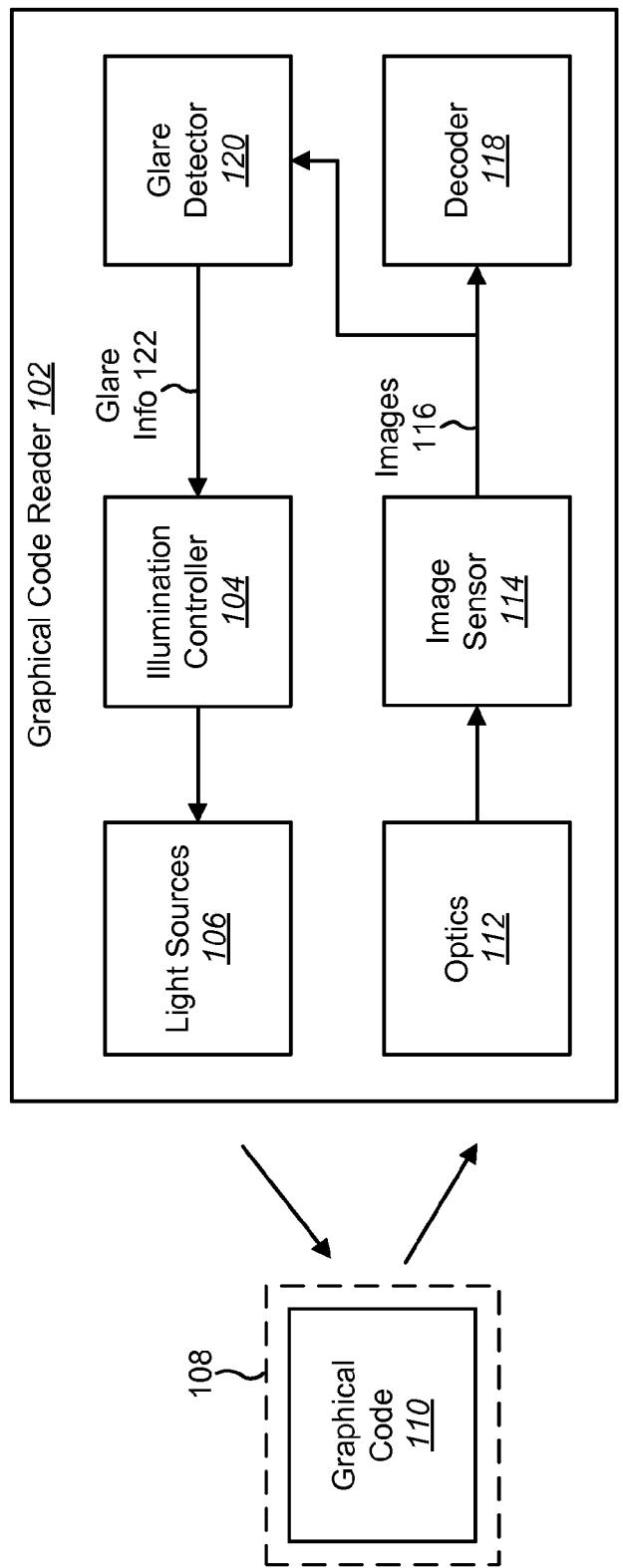
FIG. 1 illustrates an example of a graphical code reader that is configured for glare reduction in accordance with the present disclosure.

Reference is now made to FIG. 1. FIG. 1 illustrates an example of a graphical code reader 102 that is configured for glare reduction in accordance with the present disclosure. The graphical code reader 102 may be an image-based, hand-held graphical code reader 102.

The graphical code reader 102 may include an illumination controller 104. The illumination controller 104 may activate a plurality of light sources 106 (e.g., light-emitting diodes (LEDs)) to illuminate a target area 108, which in FIG. 1 is shown as including a graphical code 110. Light may be reflected from the graphical code 110 toward optics 112 within the graphical code reader 102. The optics 112, which may include one or more lenses, may focus the reflected light onto an image sensor 114.

The image sensor 114 may be a solid-state photodetecting device containing a relatively large number of light-sensitive pixels that are arranged in horizontal rows and vertical columns. Read-out circuitry may electronically read the pixels within the image sensor 114 to provide an image 116 (i.e., a two-dimensional array of image data) of the target area 108.

Captured images 116 may be provided to a decoder 118. The decoder 118 may process the captured images 116 in order to attempt to decode the graphical code 110. The reader 102 may repeatedly capture images 116 until the graphical code 110 is successfully decoded.

Captured images 116 may also be provided to a glare detector 120. The glare detector 120 may be configured to analyze the captured images 116 to determine whether glare is present in the captured images 116. If glare is present, the glare detector 120 may also be configured to determine glare information 122, i.e., information that indicates which of the light sources 106 are responsible for the glare. Examples of techniques for determining glare information will be discussed below.

The glare information 122 may be provided to the illumination controller 104. The illumination controller 104 may be configured to take corrective action to reduce the glare in subsequent images 116 based on the glare information 122 that is determined. The corrective action may include deactivating (i.e., turning off) the light sources 106 that are providing the normal component of the illumination to the target area 108.

If the image sensor 114 is configured to capture images 116 using a rolling shutter technique, then the corrective action may include sequencing the light sources 106 so as to correct glare. More specifically, the light sources 106 may be sequenced so that the light sources 106 that are providing the normal component of the illumination to an active portion of the target area 108 are turned off, and so that the light sources 106 that are not providing the normal component of the illumination to the active portion of the target area 108 are turned on. In this context, the "active" portion of the target area 108 refers to the portion of the target area 108 that corresponds to the presently exposed portion of the image sensor 114.

Figure 2:
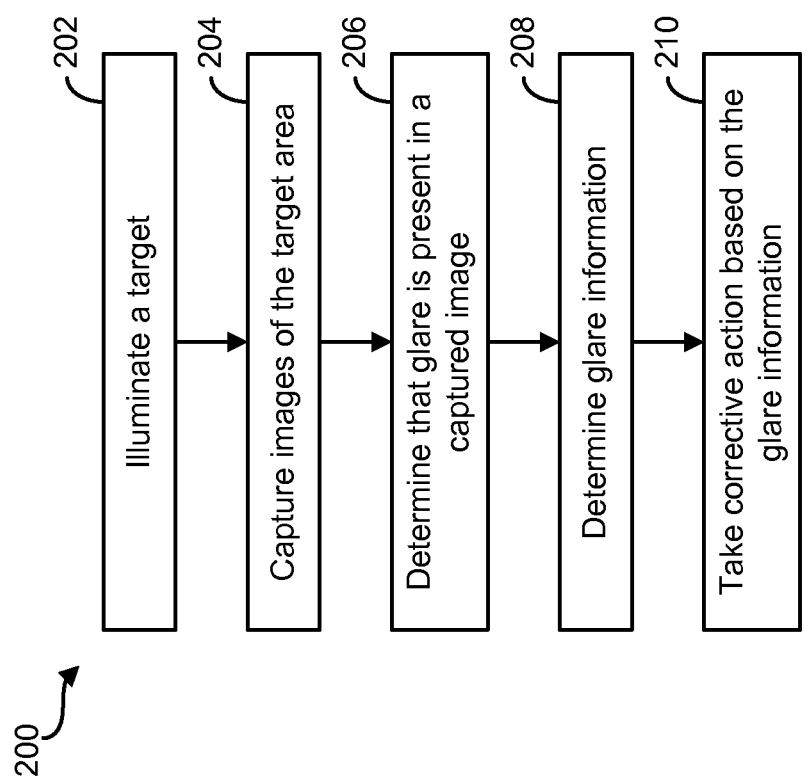
FIG. 2 illustrates an example of a method for glare reduction in accordance with the present disclosure.

Reference is now made to FIG. 2. FIG. 2 illustrates an example of a method 200 for glare reduction in accordance with the present disclosure. The method 200 may be implemented by a graphical code reader 102.

In accordance with the depicted method 200, a graphical code reader 102 may illuminate 202 a target area 108, and then capture 204 images 116 of the target area 108 using at least one image sensor 114. The graphical code reader 102 may determine 206 that glare is present in at least one captured image 116. In response to determining 206 that glare is present, the graphical code reader 102 may determine 208 glare information 122, i.e., information that indicates which of the light sources 106 are responsible for the glare.

The graphical code reader 102 may then take 210 corrective action to reduce the glare in subsequent images 116 based on the glare information 122 that is determined. For example, the corrective action may include deactivating (i.e., turning off) the light sources 106 that are providing the normal component of the illumination to the target area 108. If the image sensor 114 is configured to capture images 116 using a rolling shutter technique, then the corrective action may include sequencing the light sources 106 so that the light sources 106 that are providing the normal component of the illumination to an active portion of the target area 108 are turned off, and so that the light sources 106 that are not providing the normal component of the illumination to the active portion of the target area 108 are turned on.

As indicated above, a graphical code reader that is configured for glare reduction in accordance with the present disclosure may be configured to determine glare information, i.e., information that indicates which of the graphical code reader's light sources are responsible for glare. To make it possible to determine glare information, the light sources of the graphical code reader may be divided into two or more sets of light sources. A "set" of light sources may refer to multiple light sources, or to a single light source. Each set of light sources may be configured so that it has at least one characteristic that is unique relative to the other sets of light sources of the graphical code reader. The nature of the unique characteristic may be such that it is detectable in a captured image. Thus, the unique characteristic may function as a "signature" in the captured image. Then, when glare is present in a captured image, the characteristic that is detected in the captured image may be matched with the corresponding set of light sources in order to determine which set of light sources is responsible for the glare. Stated another way, the glare information may be determined by identifying a characteristic in a captured image that is uniquely associated with a specific set of light sources.

Figure 3:
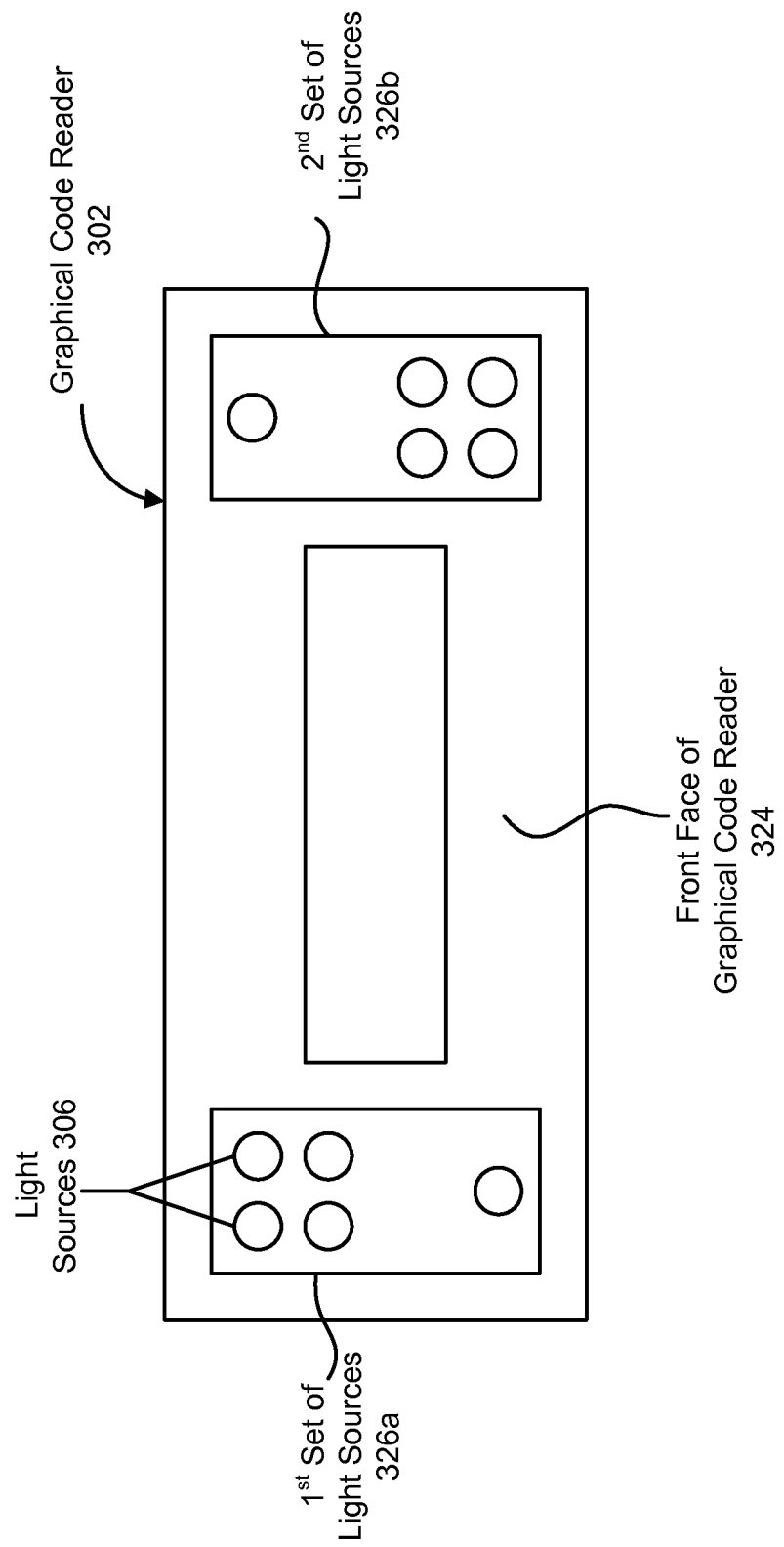
FIG. 3 illustrates an example showing how different sets of light sources may be configured so that each set has a unique characteristic relative to other sets of light sources.

Reference is now made to FIG. 3. FIG. 3 illustrates an example showing how different sets 326 of light sources 306 may be configured so that each set 326 has a unique characteristic relative to other sets 326 of light sources 306. In particular, the front face 324 of a graphical code reader 302 is shown in FIG. 3. The graphical code reader 302 includes a number of light sources 306. The light sources 306 are divided into a first set of light sources 326a and a second set of light sources 326b.

Both the first and the second sets 326a, 326b of light sources 306 include the same number of light sources 306 (five). However, the light sources 306 in the first set 326a are arranged differently than the light sources 306 in the second set 326b. In particular, the first set 326a of light sources 306 includes four light sources 306 placed above a single light source 306. In contrast, the second set of light sources 326b includes a single light source 306 placed above four light sources 306. Thus, both sets 326 of light sources 306 have a characteristic that is unique relative to the other set 326, namely, a unique pattern of arrangement of light sources 306.

If a particular set 326 of light sources 306 causes glare in a captured image, the pattern of arrangement of that set 326 of light sources 306 should be visible in the captured image. For example, if an image captured by the graphical code reader 302 shown in FIG. 3 includes four bright spots above a single bright spot (or one large bright spot above a small bright spot), then it may be concluded that the first set 326a of light sources 306 is causing glare. Conversely, if a captured image includes a single bright spot above four bright spots (or one small bright spot above a large bright spot), then it may be concluded that the second set 326b of light sources 306 is causing glare.

The unique characteristic that is shown in FIG. 3, namely the unique pattern of arrangement of light sources, is provided for purposes of example only, and should not be interpreted as limiting the scope of the present disclosure. There are many other characteristics that may be uniquely associated with sets of light sources in order to permit glare detection in accordance with the present disclosure. For example, the light sources within different sets may emit different colors of light (e.g., blue LEDs may be used in one set, and red LEDs may be used in another set). As another example, photo-masking techniques may be utilized, so that the light sources within a particular set appear to be shaped differently than the light sources within other set(s). Other techniques in addition to those specifically mentioned above may also be utilized in accordance with the present disclosure.

As discussed above, a graphical code reader in accordance with the present disclosure may be configured to determine that glare is present in a captured image, determine which light sources are responsible for the glare, and then take corrective action to reduce the glare in subsequent images. As indicated above, if the image sensor is configured to capture images using a rolling shutter technique, then the corrective action may include sequencing the light sources so as to correct glare. Several examples of techniques for sequencing the light sources will now be described.

Figure 4:
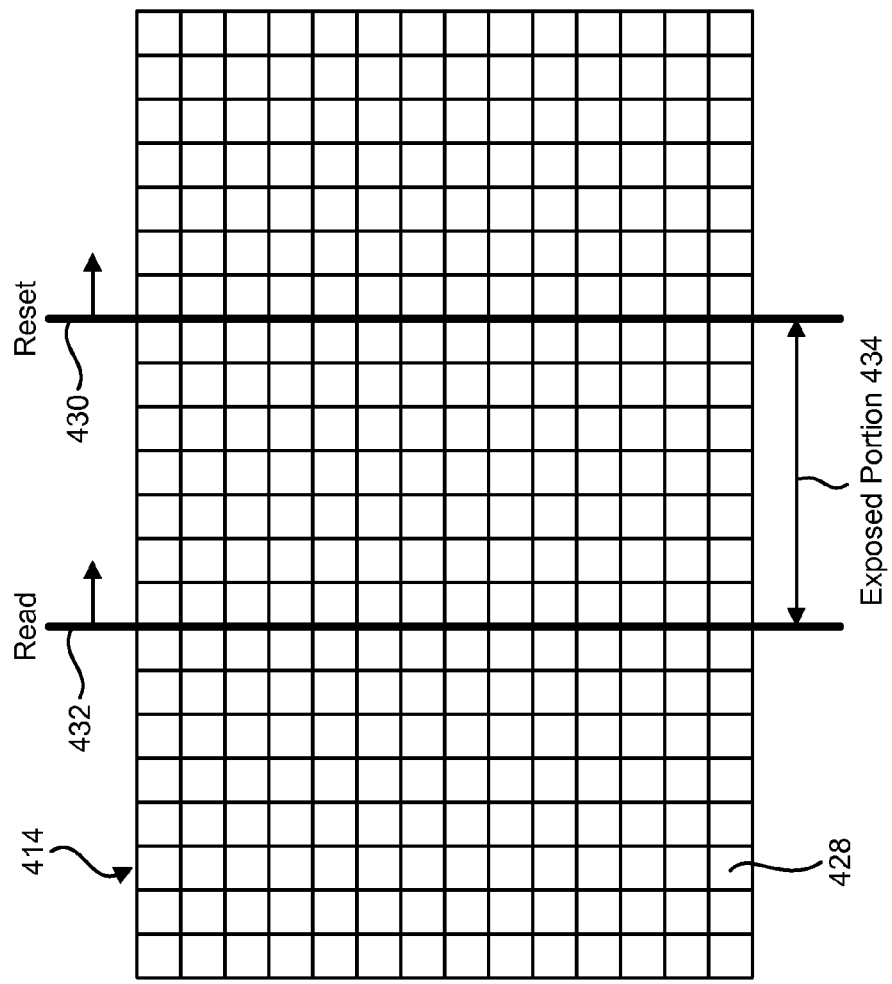
FIG. 4 illustrates an example of an image sensor that captures images in accordance with a rolling shutter technique.

Reference is now made to FIG. 4. FIG. 4 illustrates an example of an image sensor 414 that captures images in accordance with a rolling shutter technique. The image sensor 414 includes a grid of light-sensitive pixels 428 that are arranged in horizontal rows and vertical columns.

To implement the rolling shutter technique, two different signals may be utilized: a reset signal 430 and a read signal 432. The reset signal 430 may affect all of the pixels 428 in a column and may put the pixels 428 in a state to convert light intensity into an electrical signal. For example, the pixels 428 may be held at ground until the reset signal 430 is applied, after which the pixels 428 may begin to accumulate charge. The read signal 432 may similarly be applied to all of the pixels 428 in a column, and may cause the electrical signals from each pixel 428 in the column to be read electronically.

To capture an image, the reset signal 430 may be applied sequentially to each column in the image sensor 414, starting at one side of the image sensor 414 and proceeding column-by-column to the other side of the image sensor 414. At some fixed time interval after this reset process has started, the readout process may begin, i.e., the read signal may be applied sequentially to each column in the image sensor 414. The read signal 432 may be applied in the same fashion and at the same speed as the reset signal 430 was applied.

The "exposure" of a column of pixels 428 refers to the period of time between the column of pixels 428 being reset and the column of pixels 428 being read. The reset and read processes may be timed so that not all of the pixels 428 in the image sensor 414 are exposed at the same time. As shown, the exposed portion 434 of the image sensor 414 includes those pixels 428 that have been reset but not yet read.

Both the reset and read processes have been described as operating on columns of the image sensor 414. Alternatively, however, the image sensor 414 may be configured so that the reset and read processes operate on rows of the image sensor 414. The methods described herein may be used with image sensors that are configured either way.

In fact, the rolling shutter technique is not limited to being applied on a column-by-column (or row-by-row) basis. The rolling shutter technique may involve sequentially applying a reset signal 430 followed by a read signal 432 to a subset of the pixels 428 within the image sensor 414, where the subset of the pixels 428 may be a single column (or row) of pixels 428 as described above, or multiple columns (or rows) of pixels.

Figure 5A:
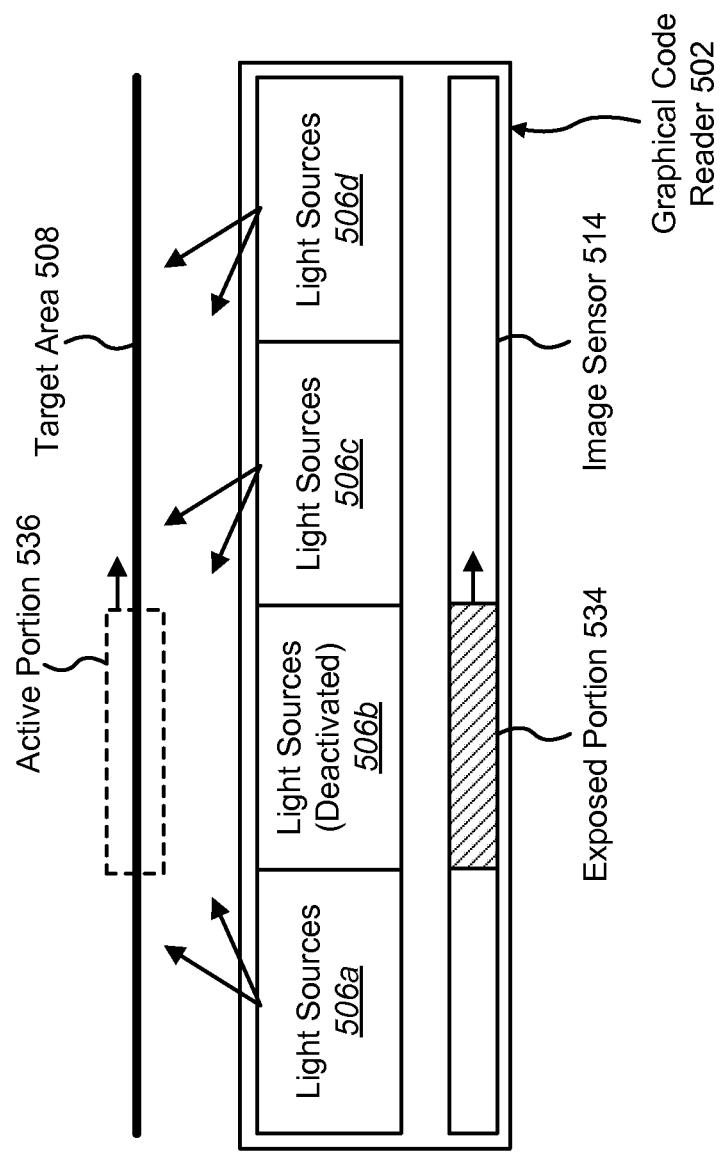
FIGS. 5A through 5C illustrate an example showing how the illumination of light sources may be sequenced for glare reduction in a graphical code reader.
Figure 5B:
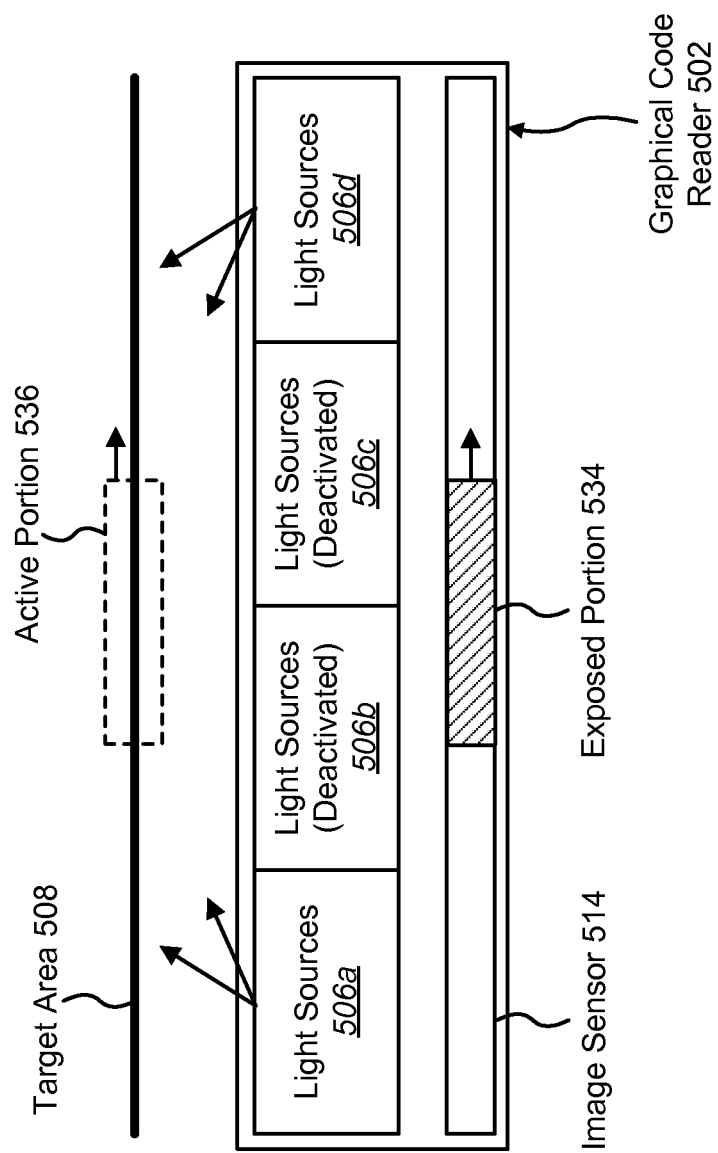
Figure 5C:
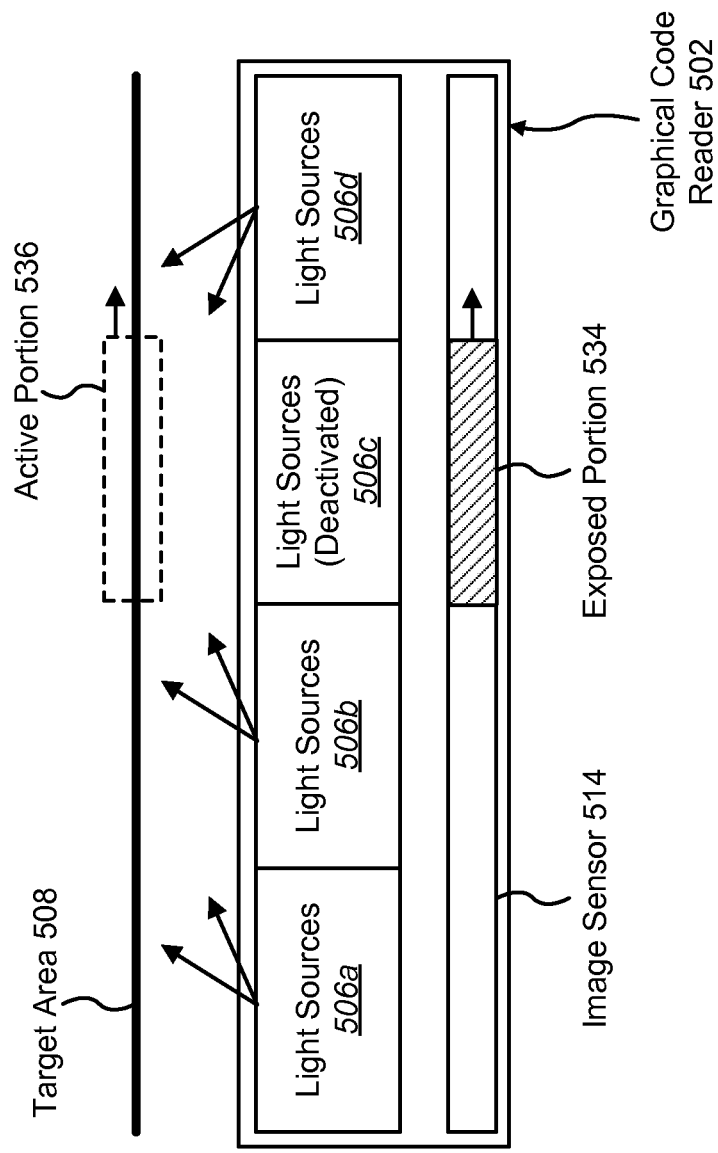

Reference is now made to FIGS. 5A through 5C. FIGS. 5A through 5C illustrate an example showing how the illumination of light sources 506 may be sequenced for glare reduction in a graphical code reader 502. In these Figures, a graphical code reader 502 is shown being used to capture an image of a target area 508. The target area 508 may include a graphical code (not shown in FIGS. 5A-5C). The view shown in these Figures is a "top-down" view, i.e., the graphical code reader 502 and the target area 508 are shown from above.

The graphical code reader 502 is shown with four different sets of light sources 506a-d. As indicated above, a "set" of light sources 506 may refer to multiple light sources 506, or to a single light source 506. As shown in FIGS. 5A-5C, the light sources 506 may be positioned so that illumination from the light sources 506 is angled toward the target area 508.

The illumination of the light sources 506 may be sequenced so that the light sources 506 that are providing the normal component of the illumination to the active portion 536 of the target area 508 are turned off, and so that the light sources 506 that are not providing the normal component of the illumination to the active portion 536 of the target area 508 are turned on. The active portion 536 of the target area 508 is the portion of the target area 508 from which light is reflected onto the presently exposed portion 534 of the image sensor 514.

FIG. 5A shows the graphical code reader 502 at a point in time after image capture has started. The exposed portion 534 of the image sensor 514 is shown positioned so that the second set of light sources 506b would, if they were activated, provide the normal component of the illumination to the active portion 536 of the target area 508. To reduce glare, the second set of light sources 506b may be deactivated (i.e., turned off). The other sets of light sources 506a, 506c, 506d may remain activated (i.e., turned on).

The exposed portion 534 of the image sensor 514 is shown moving to the right. This is because the image sensor 514 operates in accordance with a rolling shutter technique, as discussed above. Because the exposed portion 534 of the image sensor 514 is moving to the right, the active portion 536 of the target area 508 is also moving to the right.

FIG. 5B shows the graphical code reader 502 at a later point in time than FIG. 5A. At this point in time, both the second set of light sources 506b and the third set of light sources 506c would, if they were activated, provide the normal component of the illumination to the active portion 536 of the target area 508. Consequently, to reduce glare, both the second set of light sources 506b and the third set of light sources 506c may be deactivated. The other sets of light sources 506a, 506d may remain activated.

FIG. 5C shows the graphical code reader 502 at a later point in time than FIG. 5B. At this point in time, the third set of light sources 506c would, if they were activated, provide the normal component of the illumination to the active portion 536 of the target area 508. Consequently, to reduce glare, the third set of light sources 506c may remain deactivated. However, because the second set of light sources 506b is no longer providing the normal component of the illumination to the active portion 536 of the target area 508, these light sources 506b may be reactivated (i.e., turned on again).

The process illustrated in FIGS. 5A through 5C may continue in the manner described above as the exposed portion 534 of the image sensor 514 continues to move to the right until all of the pixels in the image sensor 514 have been exposed and read, and an image has thus been captured. Then, this process may be repeated for each successive image that is captured. The graphical code reader 502 may capture multiple images per second.

Various details are provided in the example of FIGS. 5A through 5C for illustration purposes, but these details should not be construed as limiting the scope of the present disclosure. The exposed portion 534 of the image sensor 514 may be larger or smaller than what is shown in FIGS. 5A through 5C. Also, there may be more sets of light sources 506 or fewer sets of light sources 506 than what is shown in FIGS. 5A through 5C. Various other details of this example may also be altered in accordance with the present disclosure.

Also, although there is just one image sensor 514 shown in FIGS. 5A-5C, a graphical code reader that is configured for glare reduction in accordance with the present disclosure may alternatively include multiple image sensors. The multiple image sensors may be utilized to capture images of the target area using a rolling shutter technique. The rolling shutter technique may involve sequentially applying a reset signal followed by a read signal to a subset of the total number of pixels within all of the image sensors, where the subset of the pixels may be a single column (or row) of pixels as described above, or multiple columns (or rows) of pixels. In fact, if the graphical code reader includes multiple image sensors, the rolling shutter technique may involve sequentially applying a reset signal followed by a read signal to all of the pixels within an entire image sensor.

Figure 6:
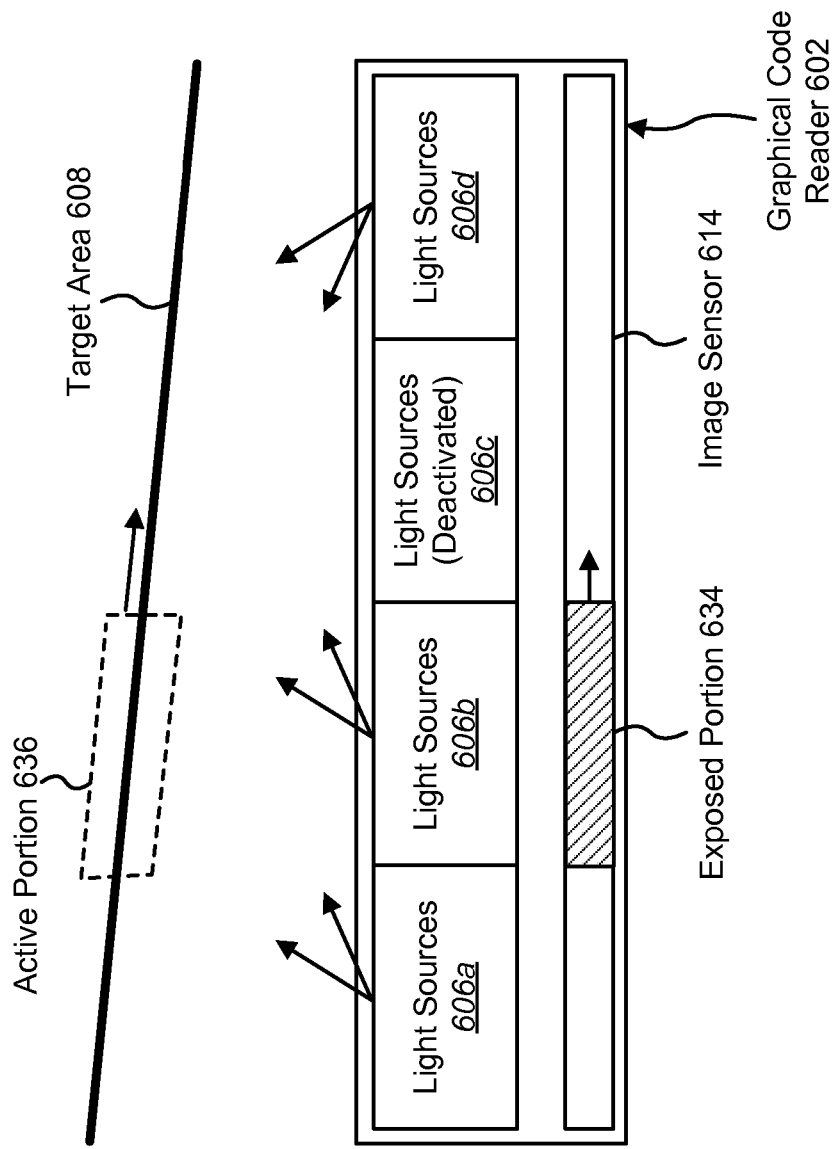
FIG. 6 illustrates a graphical code reader that is positioned so that the image sensor is angled relative to the target area.

Reference is now made to FIG. 6. FIG. 6 illustrates a graphical code reader 602 that is positioned so that the image sensor 614 is angled relative to the target area 608. At the moment of time depicted in FIG. 6, the third set of light sources 606c may be causing glare, i.e., may be providing the normal component of the illumination to the active portion 636 of the target area 608. Thus, to reduce glare, the third set of light sources 606c may be deactivated (i.e., turned off). The other sets of light sources 606a, 606b, 606d may remain activated (i.e., turned on).

Another example of a graphical code reader that is configured for glare reduction will now be described. With the graphical code reader of the present example, it will be assumed that there are two sets of light sources, one set of light sources on the left side of the front face of the graphical code reader and another set of light sources on the right side of the front face of the graphical code reader (e.g., as shown in FIG. 3). These sets of light sources will be referred to in the present discussion as left light sources and right light sources. The graphical code reader of the present example may be configured to perform glare correction differently depending on the number of glare spots that are observed in a captured image.

For example, if two glare spots are observed in a captured image, it may be concluded that the graphical code reader is being pointed substantially straight at the target (i.e., the line of sight is normal to the plane of the target). Then the light sources may be sequenced so as to correct glare, as described above.

However, if a single glare spot is observed, then it may be concluded that the graphical code reader is angled with respect to the target. If the single glare spot is on the left side of the image, then the right light sources are causing the glare. If the glare spot is on the right side of the image, then the left light sources are causing the glare. Glare correction may be performed by turning off the light sources that are causing the glare during the time when pixels near the glare region are being exposed.

A set of light sources can produce several small glare spots rather than a single glare spot for the set. Thus, the graphical code reader of the present example may be configured to perform "dilation" or "blooming"-type processing steps to merge the nearby glare spots into a single glare spot.

In the present example, four different points of interest may be defined for the purpose of performing glare correction. The points of interest may be referred to herein as p0, p1, p2, and p3. The points of interest may be used to define glare correction regions, as will be described below. For each point of interest, there is only a single component that is relevant, namely the distance along the direction of the rolling shutter.

Figure 7:
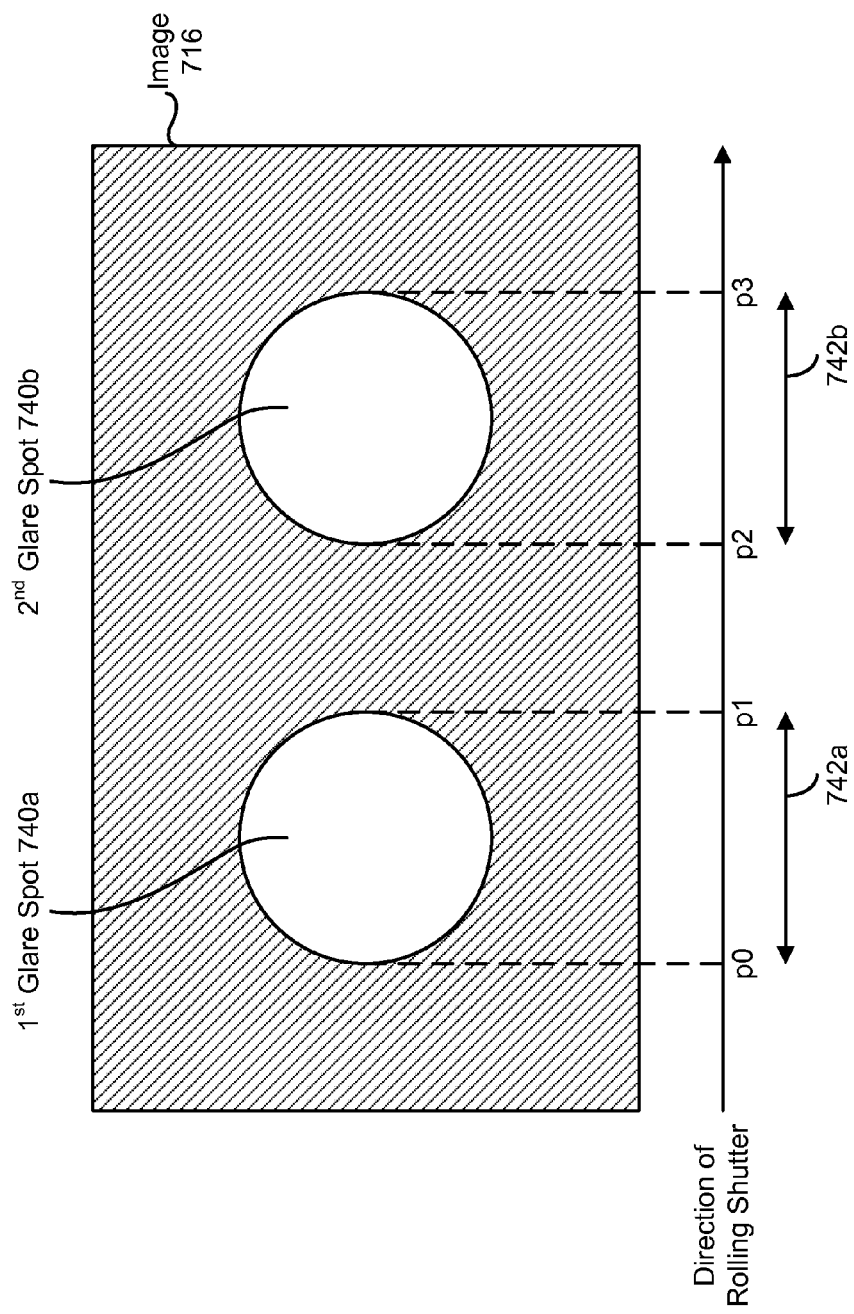
FIG. 7 shows points of interest for a captured image that includes two glare spots.

FIG. 7 shows the points of interest for a captured image 716 that includes two glare spots 740a, 740b. In the example shown in FIG. 7, the midpoint of the first glare spot 740a is positioned within the left half of the image 716, and the midpoint of the second glare spot 740b is positioned within the right half of the image 716. Alternatively, however, it is possible for both glare spots 740a, 740b to be positioned on the same side of the image 716. Where there are two glare spots 740a, 740b in a captured image 716, the point of interest p0 is the left edge of the first glare spot 740a, and the point of interest p1 is the right edge of the first glare spot 740a. The point of interest p2 is the left edge of the second glare spot 740b, and the point of interest p3 is the right edge of the second glare spot 740b. The points of interest p0 and p1 define a first glare correction region 742a, and the points of interest p2 and p3 define a second glare correction region 742b.

Figure 8:
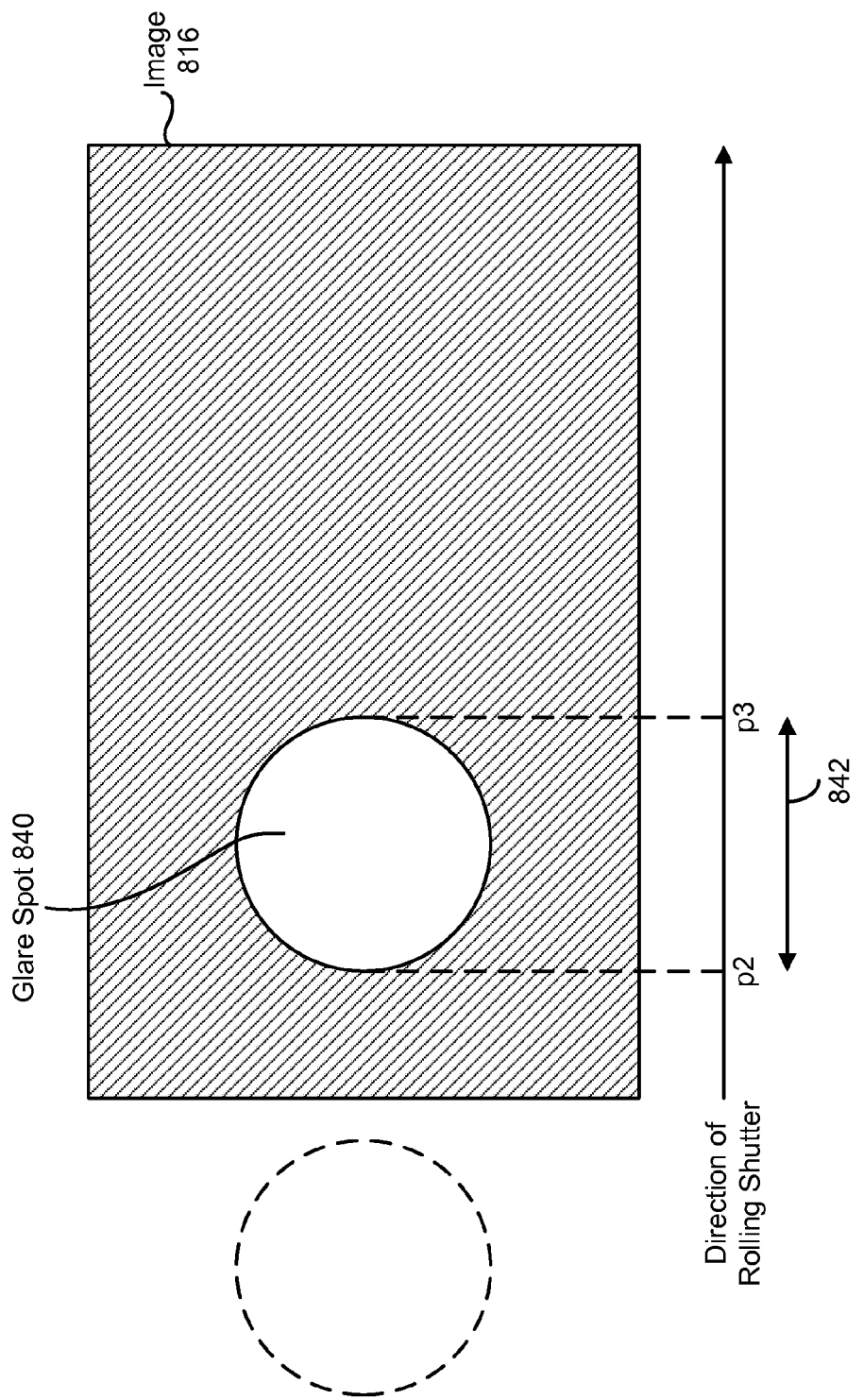
FIG. 8 shows points of interest for a captured image that includes a single glare spot.

FIG. 8 shows the points of interest for a captured image 816 that includes a single glare spot 840, where the midpoint of the glare spot 840 is positioned within the left half of the image 816. The point of interest p2 is the left edge of the glare spot 840, and the point of interest p3 is the right edge of the glare spot 840. The points of interest p2 and p3 define a single glare correction region 842.

The glare spot 840 in FIG. 8 is caused by the right light sources. Glare that may be caused by the left light sources would be outside the imaged area, as shown by the dotted lines in FIG. 8. Thus, the points of interest p0 and p1 do not exist in this image 816 (i.e., p0=p1="none").

Figure 9:
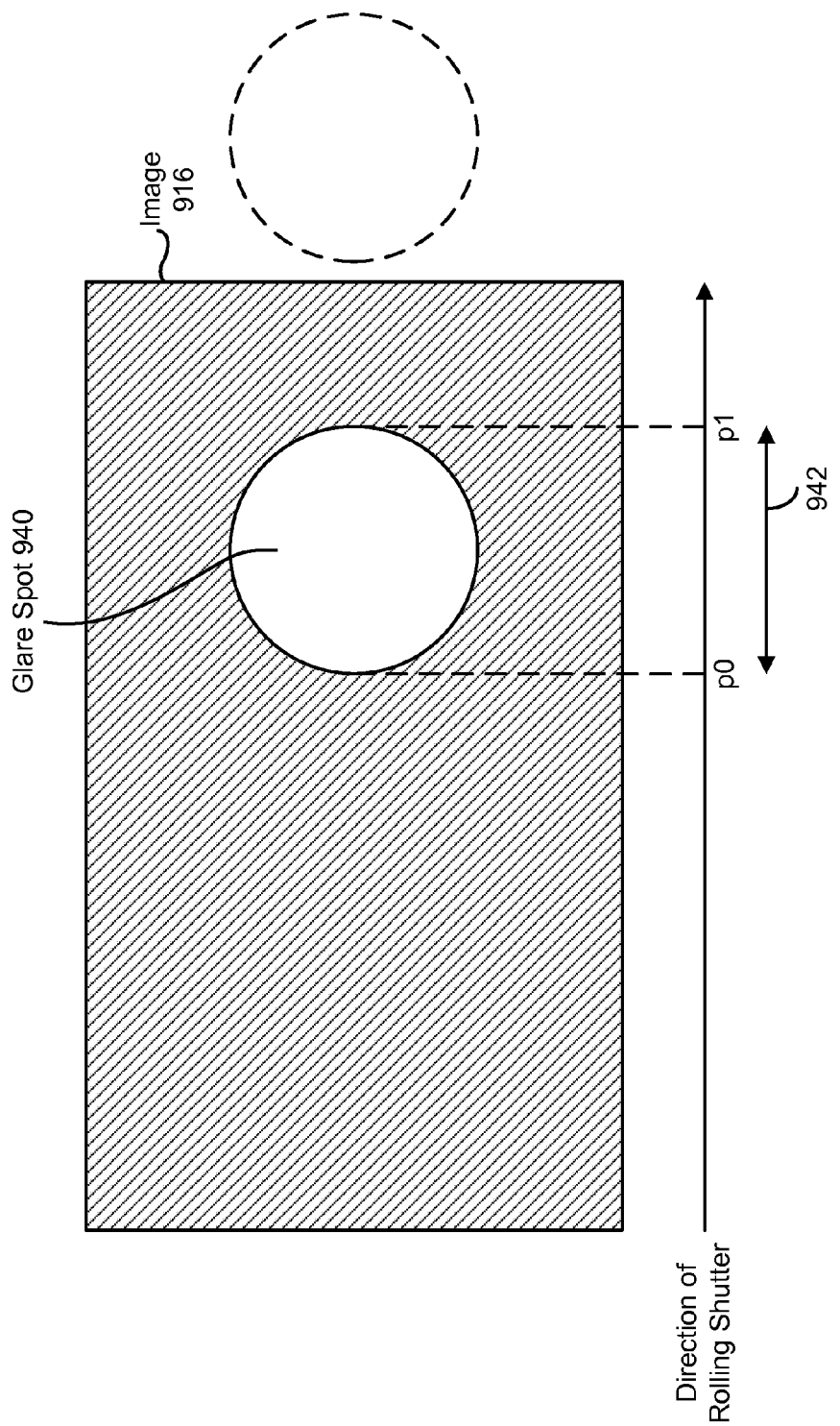
FIG. 9 shows points of interest for another captured image that includes a single glare spot.

FIG. 9 shows the points of interest for a captured image 916 that includes a single glare spot 940, where the midpoint of the glare spot 940 is positioned within the right half of the image 916. The point of interest p0 is the left edge of the glare spot 940, and the point of interest p1 is the right edge of the glare spot 940. The points of interest p0 and p1 define a single glare correction region 942.

The glare spot 940 in FIG. 9 is caused by the left light sources. Glare that may be caused by the right light sources would be outside the imaged area, as shown by the dotted lines in FIG. 9. Thus, the points of interest p2 and p3 do not exist in this image 916 (i.e., p2=p3="none").

Figure 10:
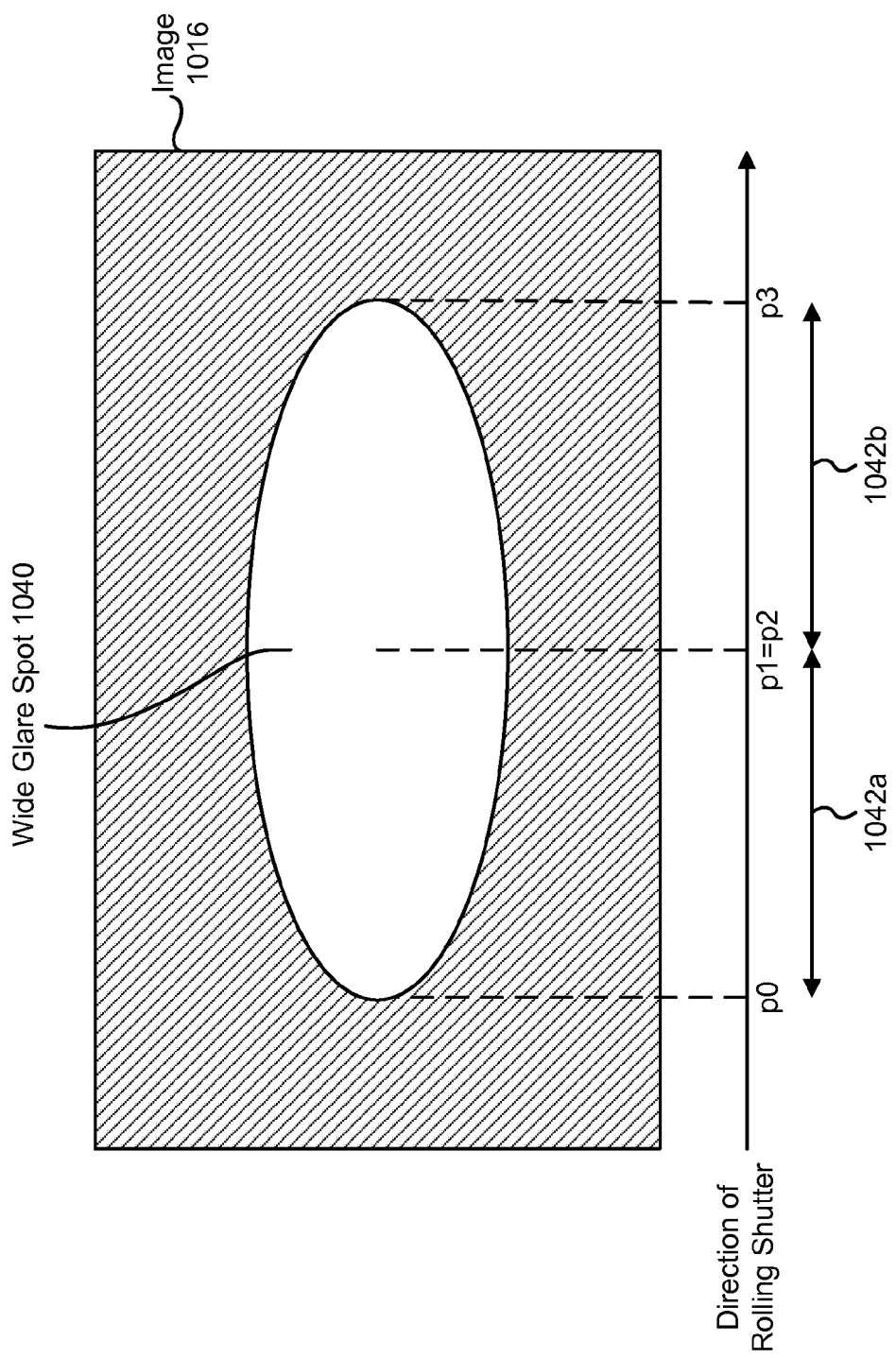
FIG. 10 shows points of interest for a captured image that includes a single wide glare spot.

FIG. 10 shows the points of interest for a captured image 1016 that includes a single wide glare spot 1040. In this context, the term "wide" means that the width of the glare spot 1040 exceeds a particular threshold, which may be a tunable parameter (i.e., a value that can be changed by a user to tailor the operation of the graphical code reader for a specific application or operating environment). The point of interest p0 is the left edge of the glare spot 1040, the points of interest p1 and p2 are the middle of the glare spot 1040, and the point of interest p3 is the right edge of the glare spot 1040.

The points of interest p0 and p1 define a first glare correction region 1042a, and the points of interest p2 and p3 define a second glare correction region 1042b. The glare correction regions 1042a, 1042b are adjacent to one another, but they control opposite light sources. As will be discussed in greater detail below, the glare correction regions 1042a, 1042b may be expanded with a predetermined amount of margin, thereby causing the glare correction regions 1042a, 1042b to overlap with one another.

Generally speaking, if glare is not detected in a captured image, this means either that (1) there would not be any glare even if glare correction techniques were not being utilized, or (2) the current glare reduction techniques are working well.

If a narrow bit of glare is detected in a captured image, this may mean that (1) there would be a narrow bit of glare even if glare correction techniques were not being utilized, or (2) there would have been a large glare spot, but the glare reduction techniques are working somewhat, preventing part of the glare.

Figure 11B:
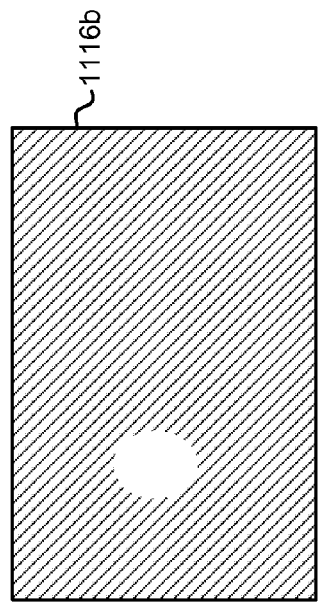
FIGS. 11B through 11D illustrate cases with imperfect glare reduction.
Figure 11D:
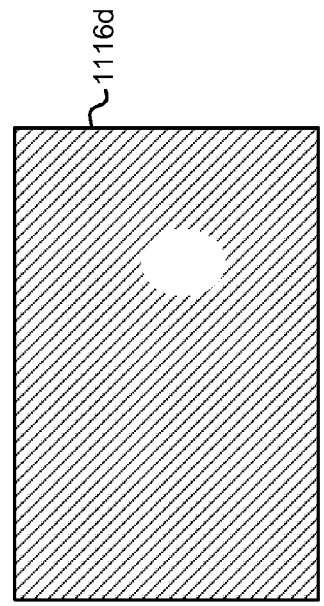
Figure 11A:
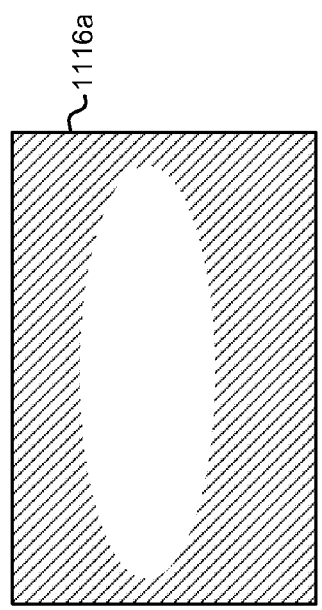
FIG. 11A illustrates uncorrected glare in a captured image.
Figure 11C:
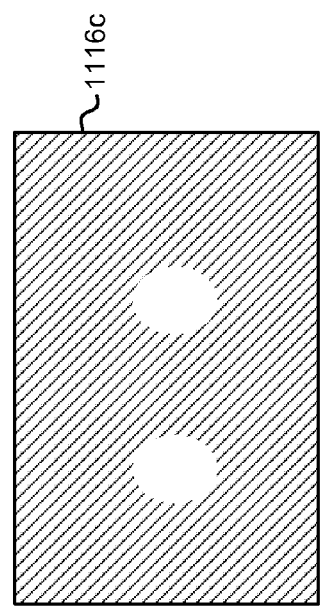

For example, suppose that the image 1116a shown in FIG. 11A shows uncorrected glare. The images 1116b, 1116c, 1116d shown in FIGS. 11B-11D illustrate glare cases with imperfect glare reduction. These imperfect cases may arise due to imperfect detection and correction (i.e., because the image processing is not exact) or from changing conditions as the reader is moved relative to the target, the position thus being different from frame to frame.

Figure 11F:
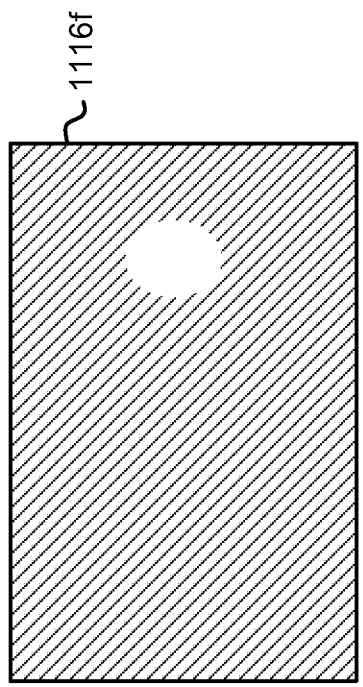
FIG. 11F illustrates an image where glare correction has been applied but the reader has moved relative to the target.
Figure 11E:
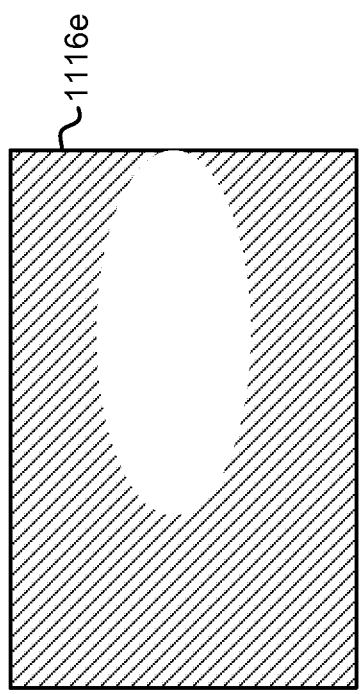
FIG. 11E also illustrates uncorrected glare in a captured image.

The latter case is illustrated further by FIGS. 11E and 11F. The image 1116e in FIG. 11E includes uncorrected glare. If correction is applied based on the glare in this image 1116e but the reader is moved relative to the target, then this may result in the image 1116f shown in FIG. 11F.

Figure 12:
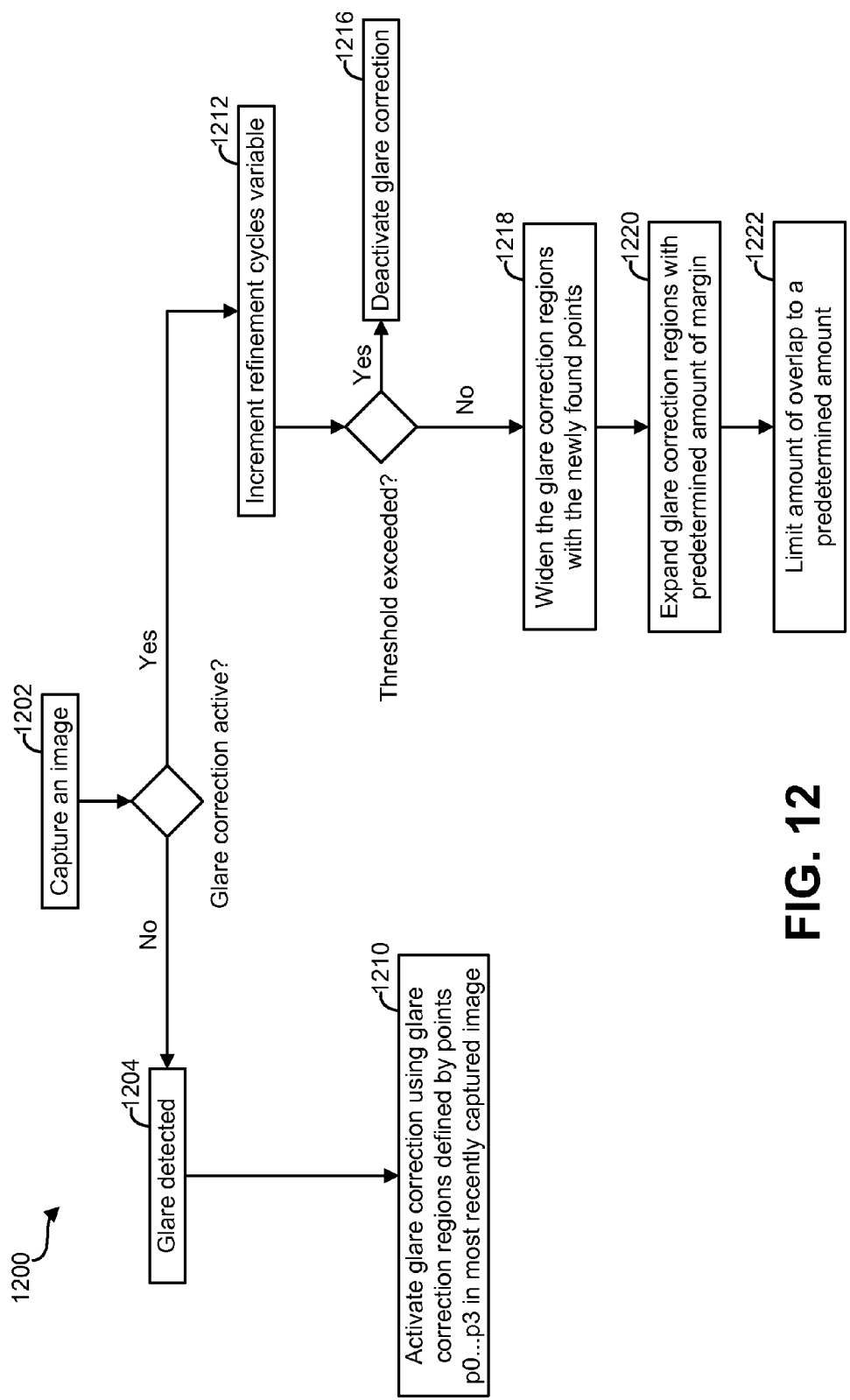
FIG. 12 illustrates certain aspects of the operation of a graphical code reader that is configured in accordance with the present disclosure.

Reference is now made to FIG. 12. To address the issues discussed above, the graphical code reader of the present example may be configured to "refine" the glare correction regions. More specifically, suppose that an image is captured 1202 and glare is detected 1204. If glare correction was not active when the image was captured 1202 (the graphical code reader of the present example is capable of operating either with or without glare correction), then glare correction is activated 1210 using the glare correction regions defined by the points p0 . . . p3 in the most recently captured image.

If glare correction was active when the image was captured 1202, then the glare correction regions may be widened 1218 with the newly found points, as follows:

$p0_{next} = \min(p0_{previous}, p0_{newly\_found})$
$p1_{next} = \max(p1_{previous}, p1_{newly\_found})$
$p2_{next} = \min(p2_{previous}, p2_{newly\_found})$
$p3_{next} = \max(p3_{previous}, p3_{newly\_found})$ In this context, the points $p0_{newly\_found} \ldots p3_{newly\_found}$ refer to the points of interest in the image that was captured 1202 most recently. The points $p0_{previous} \ldots p3_{previous}$ refer to the points of interest that were used for actively controlling the glare when the most recent image was captured 1202. The points $p0_{next} \ldots p3_{next}$ refer to the points of interest that will be used for actively controlling the glare when the next image is captured.

To prevent the problem of never-decreasing glare correction regions, the number of frame cycles that the reader stays in the refinement state may be limited. After glare correction has been active for a predefined number of frame cycles, it may be disabled, thereby restarting the cycle.

For example, if an image is captured 1202 when glare correction is active, a variable that indicates the number of frame cycles that the reader has been in the refinement state may be incremented 1212. This variable may be referred to as the refinement cycles variable. As long as the refinement cycles variable does not exceed a predetermined threshold, then the glare correction regions may be widened 1218 as discussed above. However, once the refinement cycles variable exceeds the threshold, then glare correction may be deactivated 1216, and the refinement cycles variable may be reset (e.g., to zero). This threshold may be a tunable parameter.

To allow for imprecision in the detection of glare, and also to allow for movement of the graphical code reader and/or the target, the glare correction regions may be expanded 1220 with a predetermined amount of margin. This can result in overlap of the p0 . . . p1 interval and the p2 . . . p3 interval (i.e., p1>p2). The amount of overlap may be limited 1222 to a predetermined amount, which may be referred to herein as the overlap limit. For example, if p1−p2>overlap limit, p1 may be decreased and p2 may be increased to the point that p1−p2==overlap limit. Both the amount of margin and the overlap limit may be tunable parameters.

The glare correction regions may be expanded by the predetermined amount of margin in both directions. For example, referring briefly to FIG. 7 once again, the first glare correction region 742a may be expanded by decreasing p0 and increasing p1 (i.e, p0 moves to the left and p1 moves to the right). Similarly, the second glare correction region 742b may be expanded by decreasing p2 and increasing p3. However, only one direction of expansion can result in overlap. Thus, only that direction is limited by the overlap limit. For the glare correction regions 742a, 742b in FIG. 7, increasing p1 and decreasing p2 may result in overlap, so the difference between p1 and p2 is limited by the overlap limit referred to above. Although the expansion of the glare correction regions in the opposite direction (i.e., decreasing p0 and increasing p3) does not result in overlap, such expansion may be limited by the edges of the image.

When glare correction is active, the points of interest may be used to perform glare correction in the following manner. If p0 and p1 are not "none", the left light sources are deactivated while the rolling shutter is exposing the interval from p0 through p1. If p2 and p3 are not "none", the right light sources are deactivated while the rolling shutter is exposing the interval from p2 through p3.

Figure 13A:
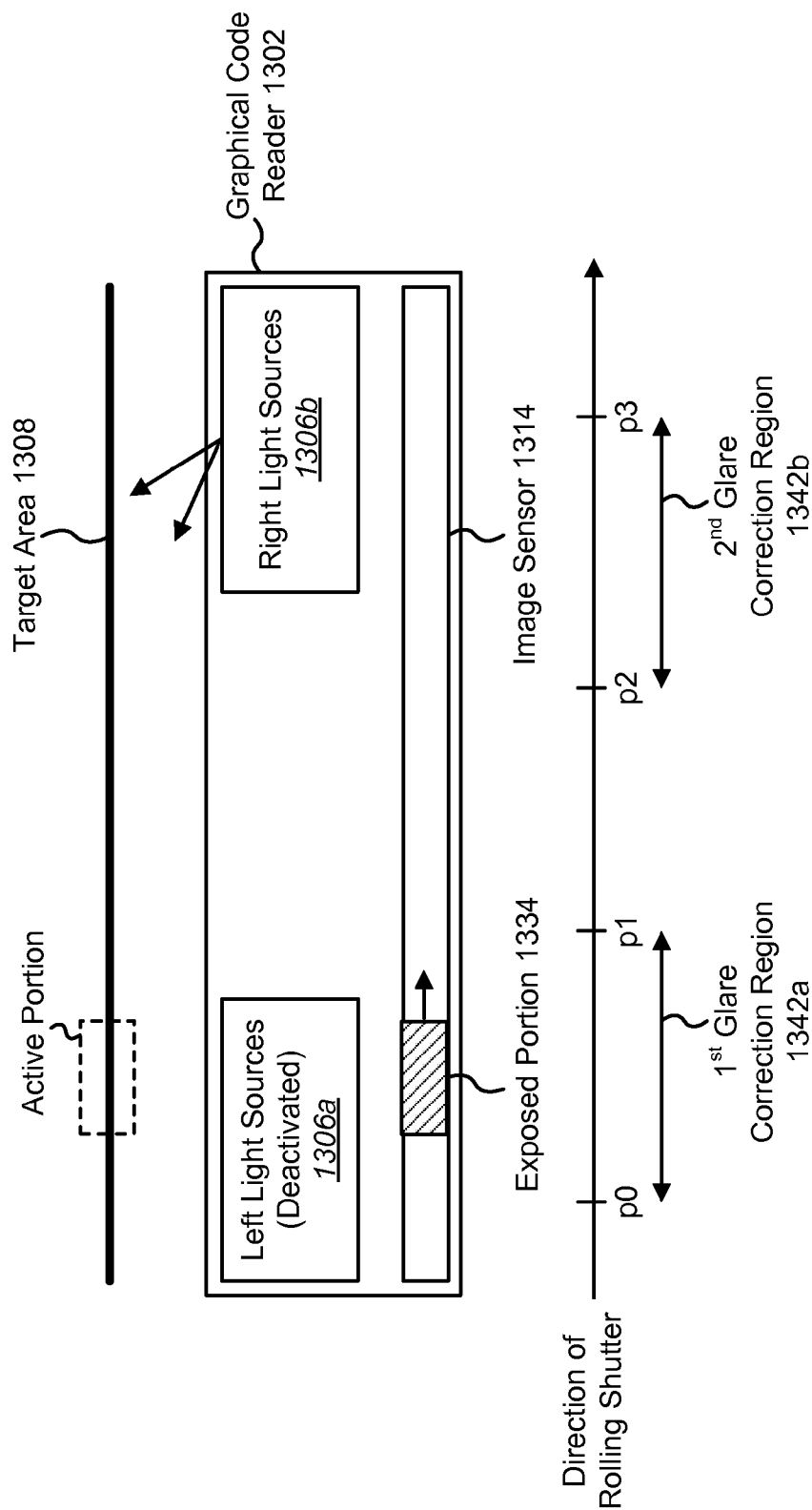
FIGS. 13A through 13C illustrate an example showing how glare correction may be performed.
Figure 13B:
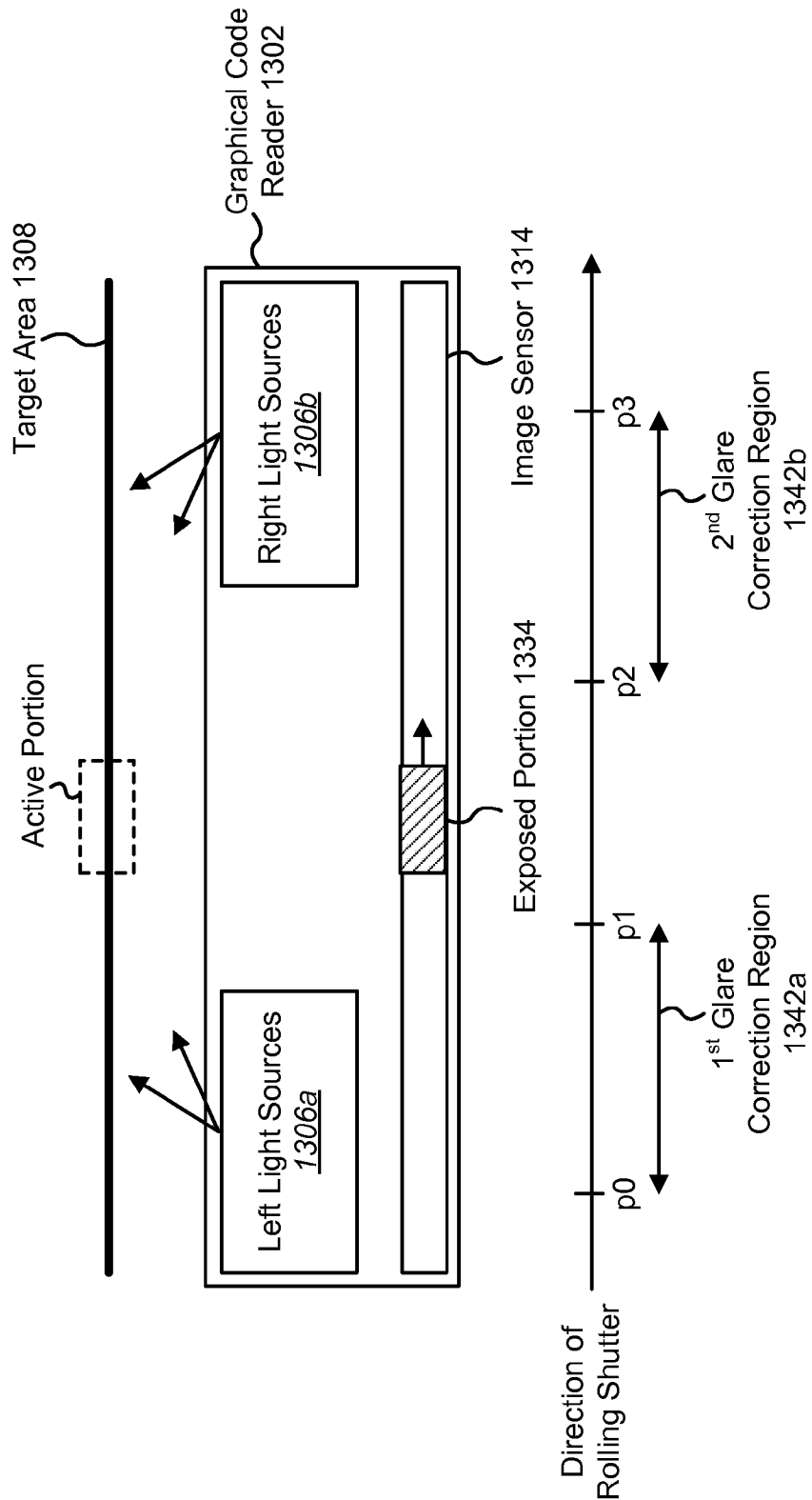
Figure 13C:
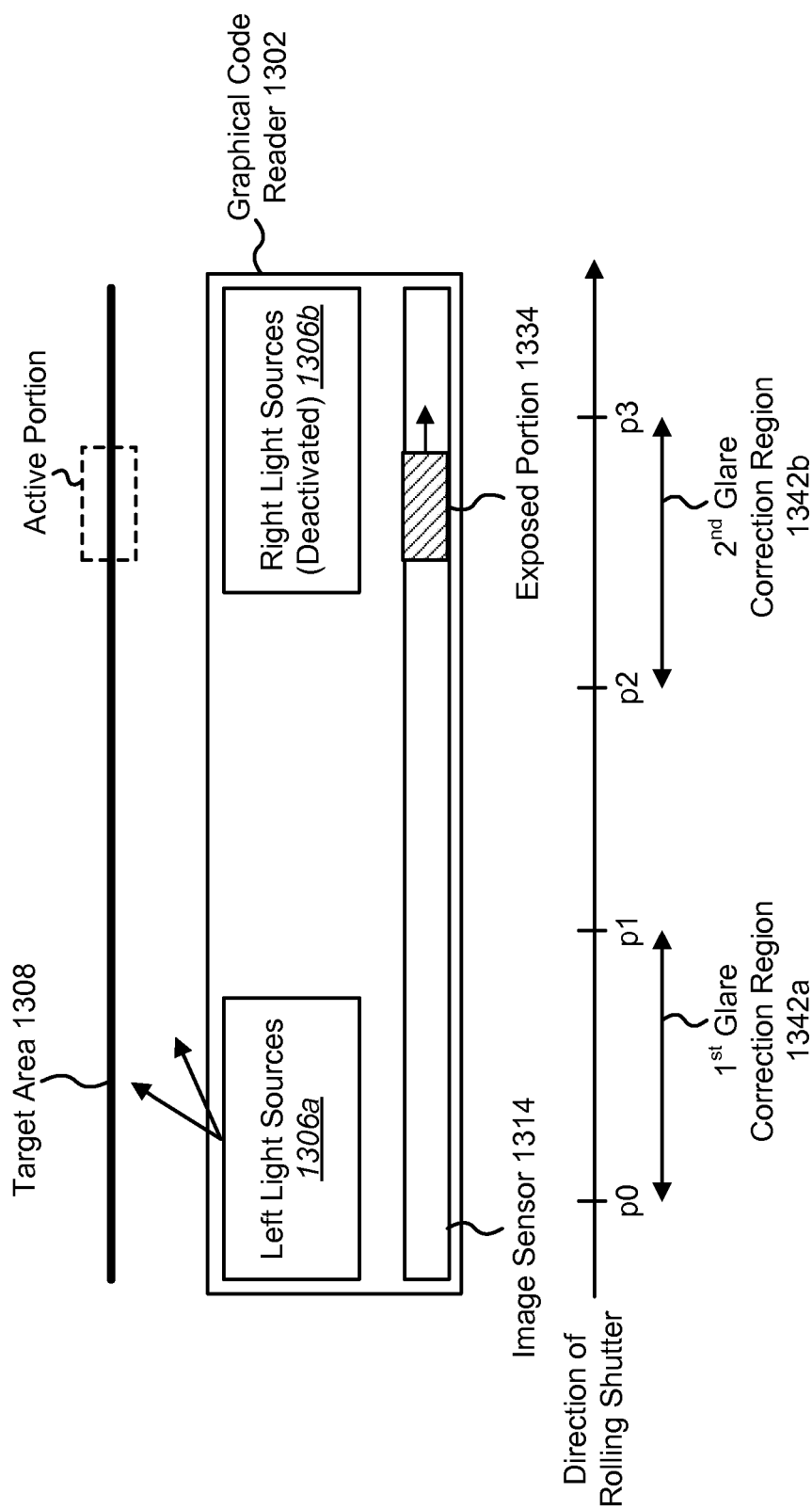

FIGS. 13A through 13C illustrate an example showing how glare correction may be performed. In this example, the graphical code reader 1302 is being pointed substantially straight at the target area 1308.

As shown in FIG. 13A, when the exposed portion 1334 of the image sensor 1314 is within a first glare correction region 1342a defined by points of interest p0 and p1, the left light sources 1306a are deactivated and the right light sources 1306b are activated.

As shown in FIG. 13B, when the exposed portion 1334 of the image sensor 1314 is between the first glare correction region 1342a and a second glare correction region 1342b defined by points of interest p2 and p3, both the left light sources 1306a and the right light sources 1306b are activated.

As shown in FIG. 13C, when the exposed portion 1334 of the image sensor 1314 is within the second glare correction region 1342b, the right light sources 1306b are deactivated and the left light sources 1306a are activated.

Figure 14A:
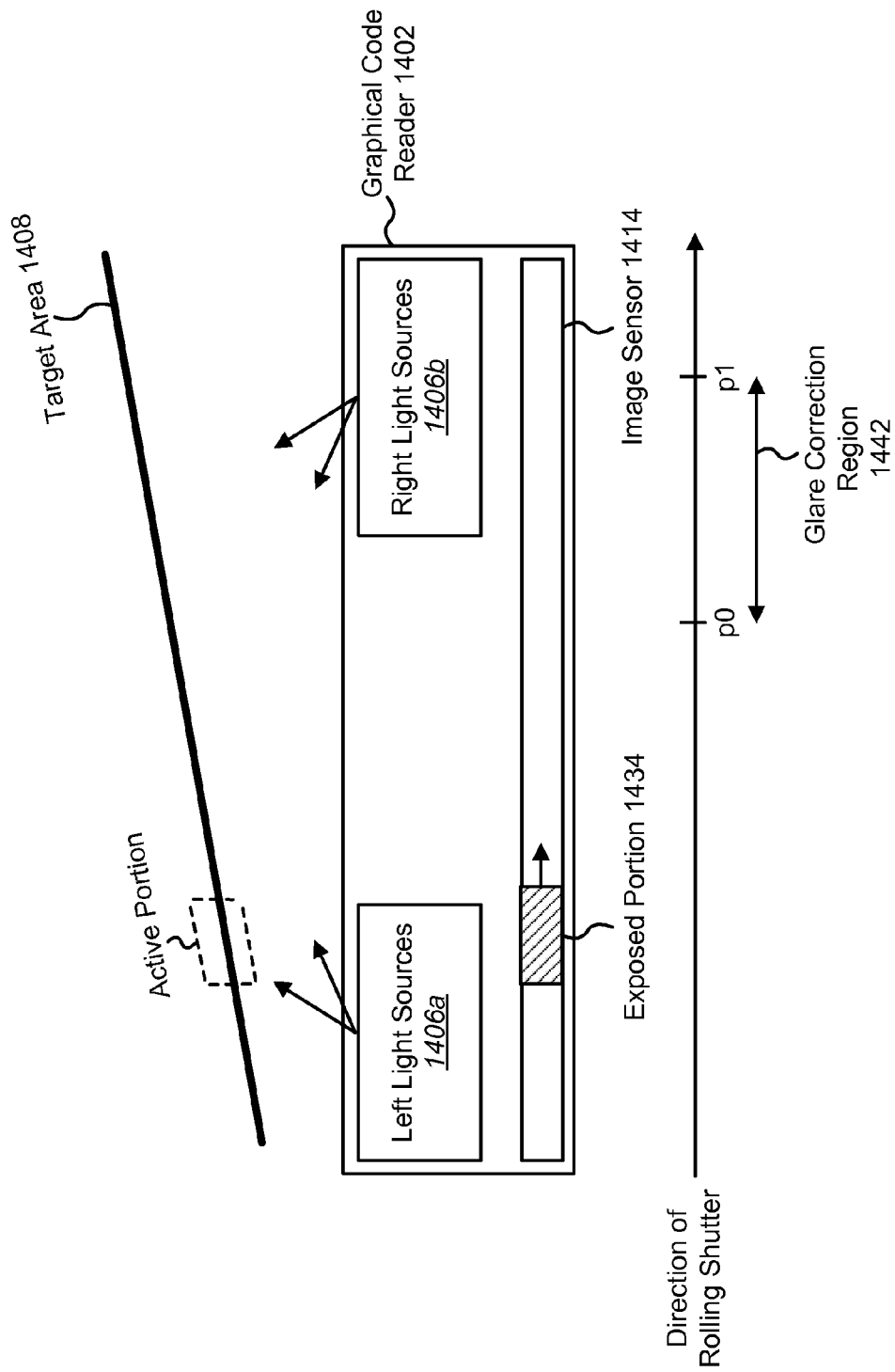
FIGS. 14A and 14B illustrate another example showing how glare correction may be performed.
Figure 14B:
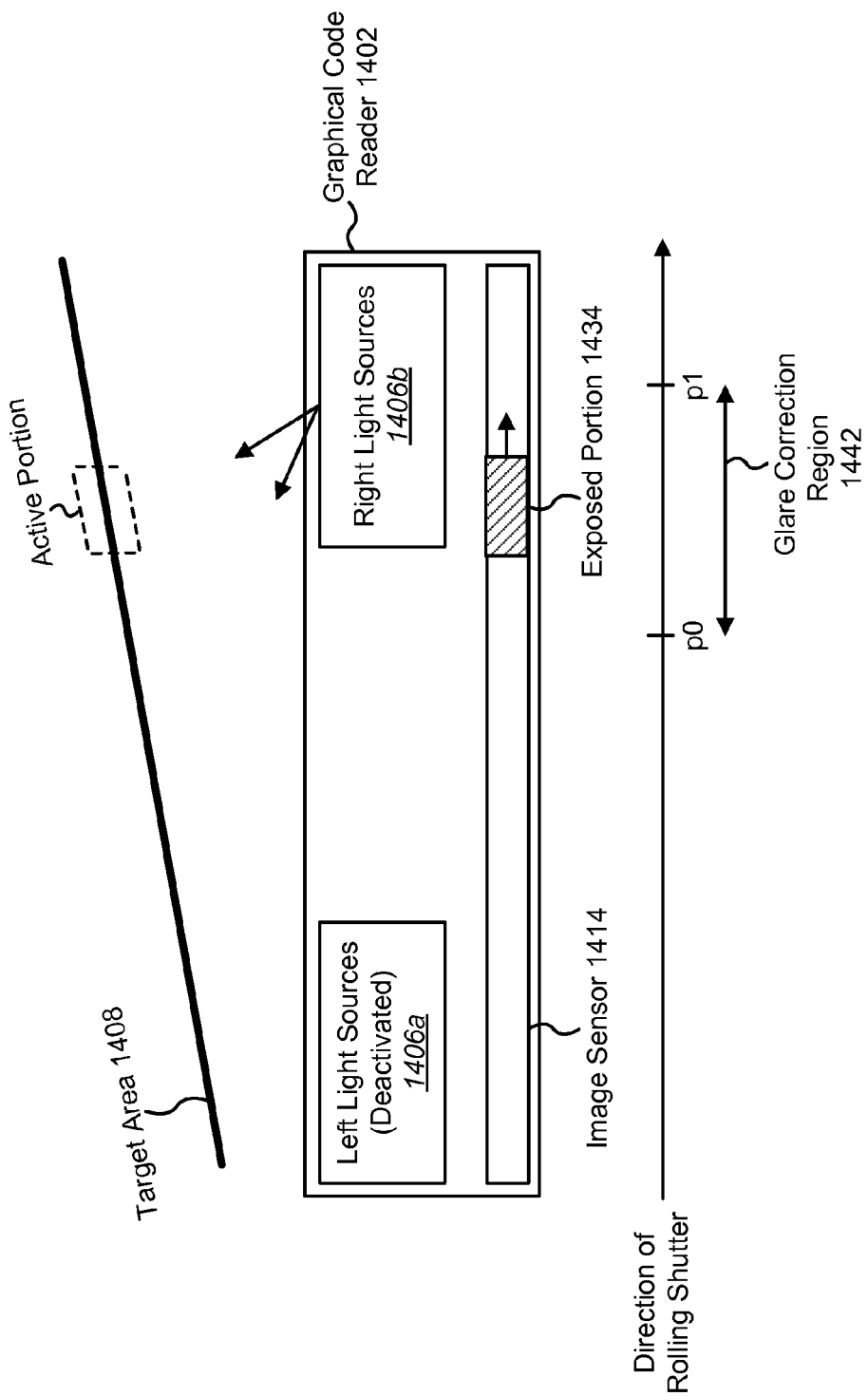

FIGS. 14A and 14B illustrate another example showing how glare correction may be performed. In this example, the graphical code reader 1402 is angled with respect to the target area 1408.

As shown in FIG. 14A, when the exposed portion 1434 of the image sensor 1414 is outside of a glare correction region 1442 defined by points of interest p0 and p1, both the left and right light sources 1406a, 1406b are activated. There is not a point of interest p2 or a point of interest p3 in this example (i.e., the points of interest p2 and p3 are "none").

As shown in FIG. 14B, when the exposed portion 1434 of the image sensor 1414 is within the glare correction region 1442, the left light sources 1406a are deactivated and the right light sources 1406b are activated.

Generally speaking, while one set of light sources is deactivated, the corresponding region within the resulting image may be darker than it otherwise would be (however, due to the rolling shutter, the dark band may have smooth edges). To compensate for this, the intensity of the set of light sources that is activated may be doubled while the other set of light sources is deactivated. If the illumination intensity limit has been reached before the intensity is doubled, then the gain may be increased to compensate.

If the glare correction regions overlap, then a dark band may appear in the part of the image that corresponds to the overlap region, because both sets of light sources are deactivated. This is why the amount of overlap is limited, as discussed above. A small amount of darkening is typically preferable to glare (and the illumination will typically appear to rise and fall smoothly owing to the rolling shutter).

Figure 15:
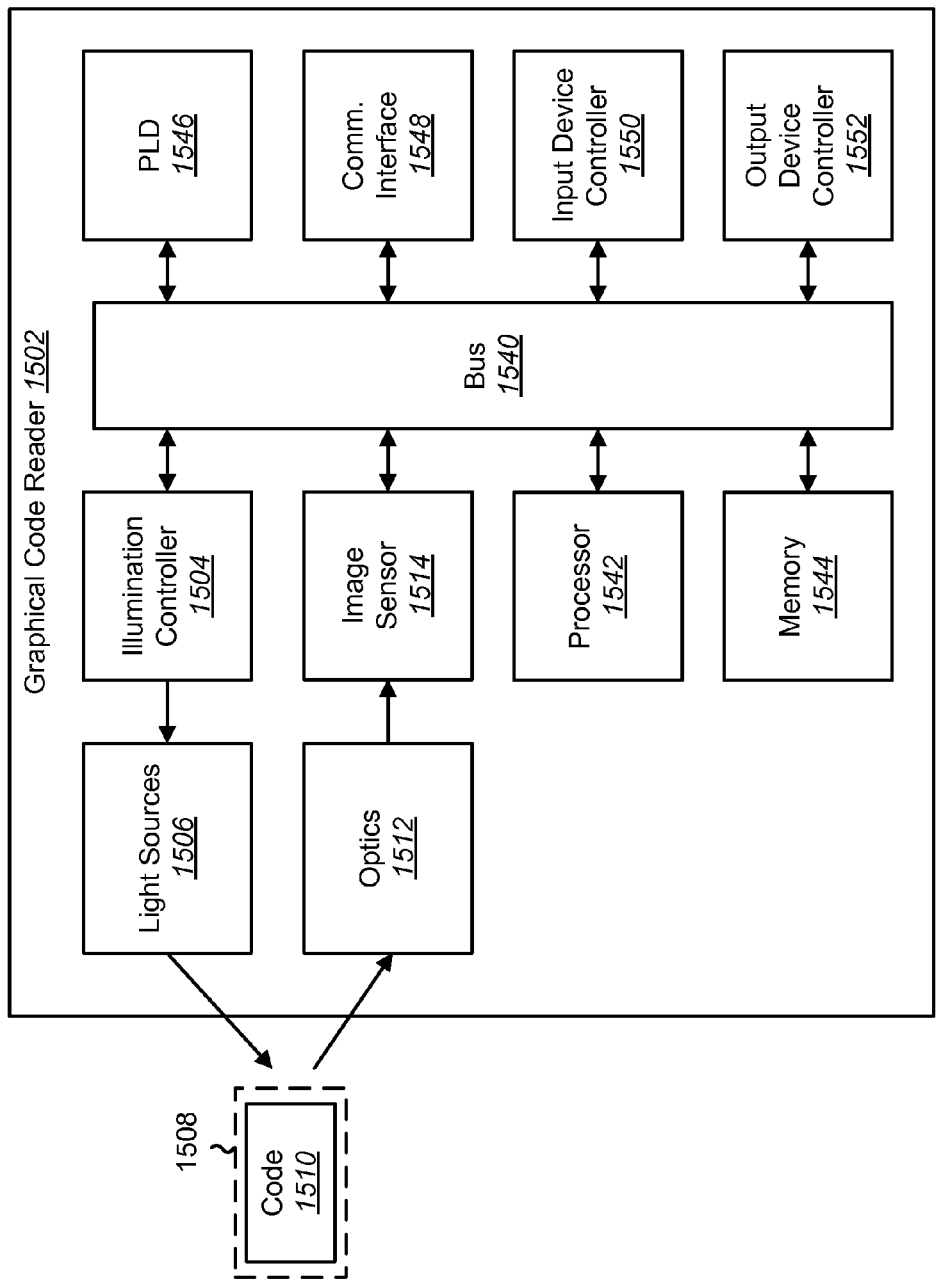
FIG. 15 illustrates various components that may be included in a graphical code reader.

Reference is now made to FIG. 15. FIG. 15 illustrates various components that may be included in a graphical code reader 1502. The graphical code reader 1502 is shown with a plurality of light sources 1506 that may be activated to illuminate a graphical code 1510. The light sources 1506 may be controlled by an illumination controller 1504, which may be in electronic communication with other components in the graphical code reader 1502 via a system bus 1540.

The graphical code reader 1502 may also include optics 1512 and an image sensor 1514. As discussed above, the image sensor 1514 may include a plurality of light-sensitive elements, or pixels. The optics 1512 may focus light reflected from the target area 1508 (i.e., the area that is illuminated by the light sources 1506) onto the image sensor 1514. A housing (not shown) may be provided for shielding the light-sensitive elements in the image sensor 1514 from ambient light. The image sensor 1514 may be in electronic communication with other components in the graphical code reader 1502 via the system bus 1540.

The graphical code reader 1502 is also shown with a processor 1542 and memory 1544. The processor 1542 may control various aspects of the operation of the graphical code reader 1502 and may be embodied as a microprocessor, a microcontroller, a digital signal processor (DSP), etc. The processor 1542 may perform logical and arithmetic operations based on program instructions stored within the memory 1544.

As used herein, the term "memory" may be broadly defined as any electronic component capable of storing electronic information, and may be embodied as read only memory (ROM), random access memory (RAM), magnetic disk storage media, optical storage media, flash memory devices in RAM, on-board memory included with the processor 1542, EPROM memory, EEPROM memory, registers, etc. The memory 1544 may store program instructions and other types of data. The program instructions may be executed by the processor 1542 to implement some or all of the methods disclosed herein. The processor 1542 and memory 1544 may be in electronic communication with other components in the graphical code reader 1502 via the system bus 1540.

The graphical code reader 1502 may also include one or more programmable logic devices (PLDs) 1546. The PLDs 1546 may be programmed to carry out logic functions that implement, either partially or completely, some or all of the methods disclosed herein. Examples of different types of PLDs 1546 that may be used include field-programmable gate arrays (FPGAs), logic-cell arrays (LCAs), programmed arrays of logic (PALs), complex programmable-logic devices (CPLDs), and so forth. The PLDs 1546 may be in electronic communication with other components in the graphical code reader 1502 via the system bus 1540. One or more application-specific integrated circuits (ASICs) may be used in place of or in addition to the PLDs 1546.

The graphical code reader 1502 is also shown with a communication interface 1548 for communicating with other electronic devices. The communication interface 1548 may be based on wired communication technology, wireless communication technology, etc. Examples of different types of communication interfaces 1548 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth. The communication interface 1548 may be in electronic communication with other components in the graphical code reader 1502 via the system bus 1540.

The graphical code reader 1502 is also shown with an input device controller 1550 for controlling input devices, such as keys, buttons, etc. The graphical code reader 1502 is also shown with an output device controller 1552 for controlling output devices, such as a display screen. The input device controller 1550 and output device controller 1552 may be in electronic communication with other components in the graphical code reader 1502 via the system bus 1540.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules, circuits and algorithm steps described in connection with the embodiments disclosed herein may be implemented as electronic hardware, computer software or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as limiting the scope of the claims.

The various illustrative logical blocks, modules and circuits described herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for glare reduction, the method being implemented by a graphical code reader, the method comprising:
    illuminating a target area using a first light source;
    capturing images of the target area using at least one image sensor;
    determining that glare from the first light source is present in at least one captured image by identifying whether a unique signature characteristic of the first light source exists as specular reflection from a surface of an object within the captured image; and
    taking corrective action to reduce the glare in subsequent images.

2. The method of claim 1, wherein taking corrective action to reduce the glare comprises deactivating the first light source that is causing glare within the captured image.

3. The method of claim 1, wherein the target area is sequentially illuminated, and wherein taking corrective action to reduce the glare comprises altering the sequencing of the light sources so that light sources that are providing a normal component of the illumination to an active portion of the target area are turned off, and so that the light sources that are not providing the normal component of the illumination to the active portion of the target area are turned on.

4. The method of claim 1, wherein the unique signature characteristic is a pattern of arrangement of the first light source within the image.

5. The method of claim 1, wherein taking corrective action to reduce the glare comprises illuminating the target area using a second light source, the second light source being of a different wavelength than the first light source.

6. The method of claim 5, wherein the wavelength of the second light source corresponds to red illumination.

7. A graphical code reader that is configured to perform glare reduction, comprising:
    a plurality of light sources that are configured to illuminate a target area;
    at least one image sensor that is configured to capture images of the target area;
    a glare detector that is configured to:
        determine that glare is present in at least one captured image by identifying a unique signature characteristic of at least one of the plurality of light sources existing as specular reflection from a surface of an object within the captured image; and
        determine which of the at least one plurality of light sources is responsible for the glare; and
    an illumination controller that is configured to take corrective action to reduce the glare in subsequent images based on the glare information that is determined.

8. The graphical code reader of claim 7, wherein taking corrective action to reduce the glare comprises deactivating the light sources that are causing glare within the captured image.

9. The graphical code reader of claim 7, wherein the target area is sequentially illuminated, and wherein taking corrective action to reduce the glare comprises altering the sequencing of the light sources so that the light sources that are providing a normal component of the illumination to an active portion of the target area are turned off, and so that the light sources that are not providing the normal component of the illumination to the active portion of the target area are turned on.

10. The graphical code reader of claim 7, wherein the unique signature characteristic is a pattern of arrangement of the light sources within the image.

11. The graphical code reader of claim 7, wherein taking corrective action to reduce the glare comprises illuminating the target area using a second light source, the second light source being of a different wavelength than the light source causing the glare in the captured image.

12. The graphical code reader of claim 11, wherein the wavelength of the second light source corresponds to red illumination.

13. A graphical code reader that is configured to perform glare reduction, comprising:
    means for illuminating a target area using a plurality of light sources;
    means for capturing images of the target area using at least one image sensor;
    means for determining that glare is present in at least one captured image by identifying a unique signature characteristic of at least one of the plurality of light sources existing as specular reflection within the captured image;
    means for determining which of the at least one of the plurality of light sources is responsible for the glare; and
    means for taking corrective action to reduce the glare in subsequent images based on the glare information that is determined.

14. The graphical code reader of claim 13, wherein taking corrective action to reduce the glare comprises deactivating the light sources that are causing the glare within the captured image.

15. The graphical code reader of claim 13, wherein taking corrective action to reduce the glare comprises illuminating the target area using a second light source, the second light source being of a different wavelength than the light source causing the glare in the captured image.

16. The graphical code reader of claim 15, wherein the wavelength of the second light source corresponds to red illumination.

17. A graphical code reader that is configured to perform glare reduction, the graphical code reader comprising:
    a first light source of a first wavelength configured to project illumination into a target area;
    at least one image sensor that is configured to capture an image of the target area when the first light source is projecting illumination of the first wavelength into the target area;
    a glare detector that is configured to determine that glare is present in the image if a unique signature characteristic of the first light source is present as specular reflection from a surface of an object within the target area; and an illumination controller that is configured to take corrective action to reduce the glare in subsequent images based on the determination that glare is present in the image.

18. The graphical code reader of claim 17, wherein taking corrective action to reduce the glare comprises deactivating the first light source.

19. The graphical code reader of claim 17, wherein taking corrective action to reduce the glare comprises illuminating the target area using a second light source, the second light source being of a different wavelength than the first light source.

20. The graphical code reader of claim 19, wherein the wavelength of the second light source corresponds to red illumination.

* * * * *